(12) United States Patent
Soma et al.

(10) Patent No.: US 6,473,373 B1
(45) Date of Patent: Oct. 29, 2002

(54) OPTICAL DISK APPARATUS HAVING COMPENSATION FOR OBJECTIVE LENS DISLOCATION

(75) Inventors: Yasuhito Soma, Hirakata; Akira Matsubara, Kameoka; Kazuhiko Kouno, Takatsuki, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/492,269

(22) Filed: Jan. 27, 2000

(30) Foreign Application Priority Data

Jan. 27, 1999 (JP) .......................................... 11-018363

(51) Int. Cl.⁷ ................................................ G11B 7/00
(52) U.S. Cl. .................................. 369/44.29; 369/44.35
(58) Field of Search ...................... 369/44.32, 44.35, 369/44.29, 53.28, 44.27, 44.28, 44.36, 47.36, 47.38, 47.39, 47.4, 53.3

(56) References Cited

U.S. PATENT DOCUMENTS 4,858,216 A    8/1989   Kamiya 6,044,050 A    3/2000   Kuroiwa

FOREIGN PATENT DOCUMENTS

| JP | 5-39020   | 11/1985 |
| JP | 60-236125 | 11/1985 |
| JP | 9-223320  | 8/1997  |
| JP | 10-112043 | 4/1998  |

Primary Examiner—Paul W. Huber
(74) Attorney, Agent, or Firm—Parkhurst & Wendel, L.L.P.

(57) ABSTRACT

The present invention provides an optical disc apparatus which solves a problem that the tracking control takes off when an objective lens is displaced in the tracking direction due to its weight. In this optical disc apparatus, a spot position detector 108 generates a spot position signal which indicates a position of a light spot on a light receiving element 105, and supplies the signal to a traverse loop filter 111 and a spot position loop filter 109. A controller 115 supplies an output from the spot position loop filter 109 to a tracking actuator 104, before supplying an output from the traverse loop filter 111 to a traverse motor 113, previously moves the light spot near the center of the light receiving element 105, and starts the traverse control in a state where a value of the spot position signal at starting of the traverse control is reduced.

8 Claims, 20 Drawing Sheets open-loop gain characteristics without spot position loop filter 111 gain characteristics of spot position loop filter 111 open-loop characteristics of whole spot position control open-loop gain
characteristics
without spot position
loop filter 111 gain characteristics
of spot position
loop filter 111 open-loop
characteristics of
whole spot
position control

Fig.18 (a) open-loop gain characteristics without spot position loop filter 111
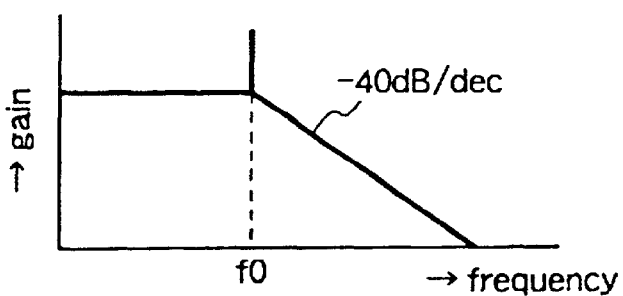
Fig.18 (b) gain characteristics of spot position loop filter 111
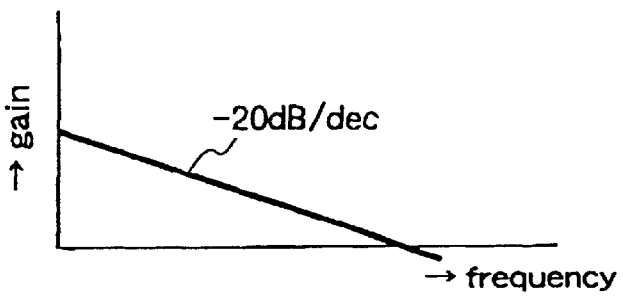
Fig.18 (c) open-loop characteristics of whole spot position control
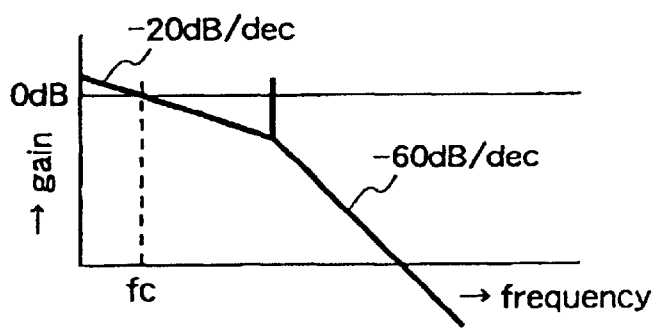
Fig.18 (d) gain characteristics of changed spot position loop filter 111
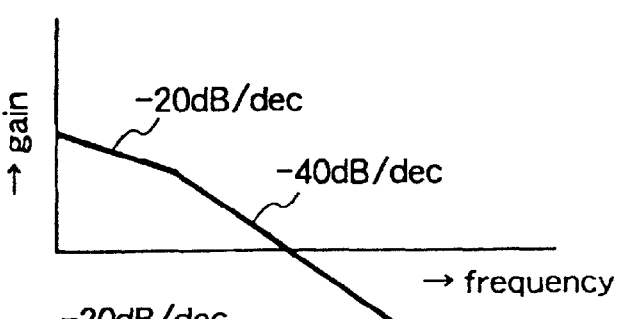
Fig.18 (e) open-loop characteristics of whole changed spot position control
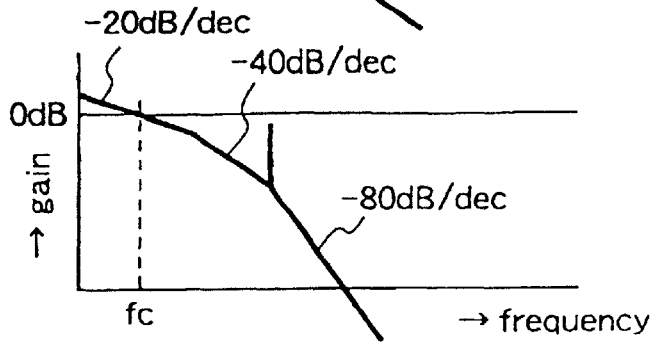

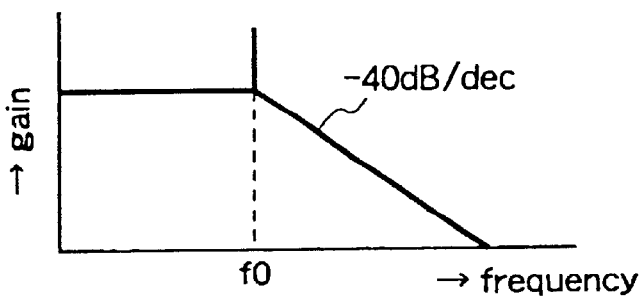
Fig.19 (a) open-loop gain characteristics without spot position loop filter 111
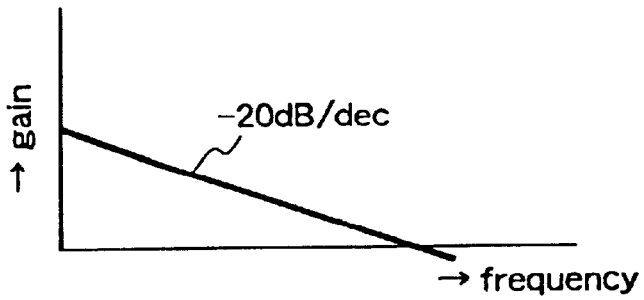
Fig.19 (b) gain characteristics of spot position loop filter 111
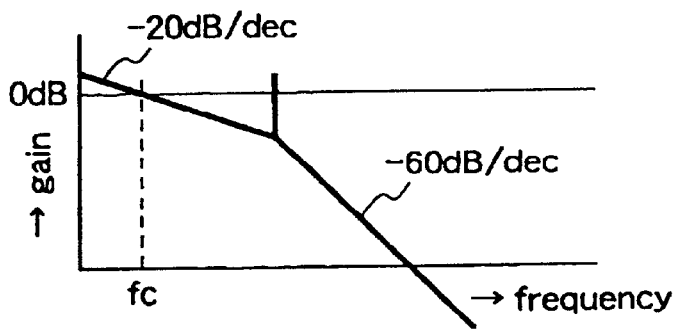
Fig.19 (c) open-loop characteristics of whole spot position control
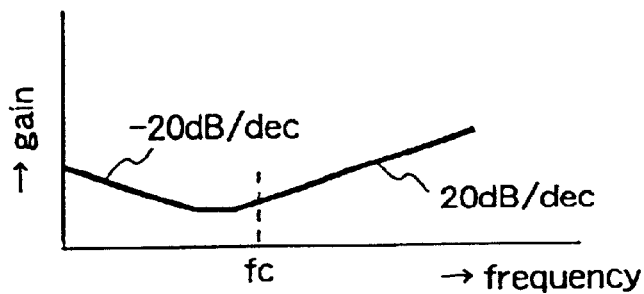
Fig.19 (d) gain characteristics of spot position loop filter 111
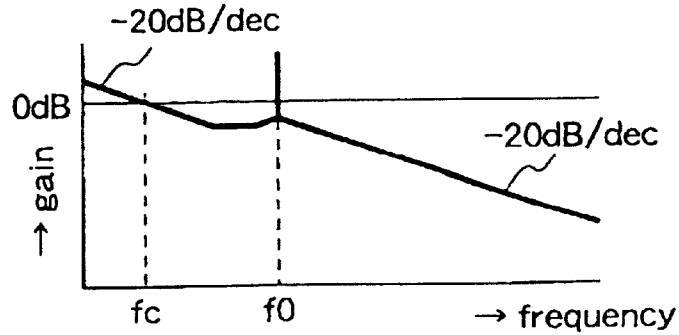
Fig.19 (e) open-loop characteristics of whole spot position control Fig.20 (a) open-loop gain characteristics without spot position loop filter 111
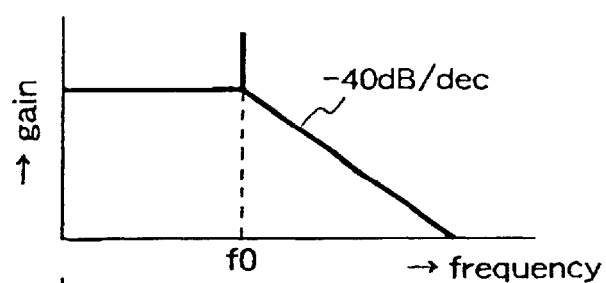

Fig.20 (b) gain characteristics of spot position loop filter 111
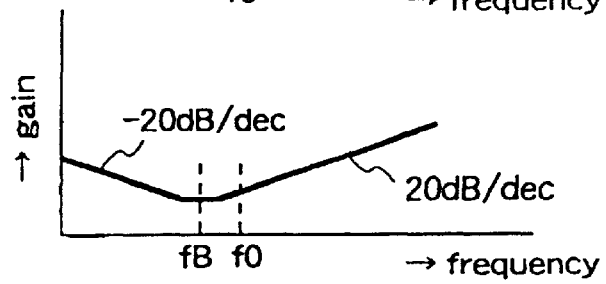

Fig.20 (c) open-loop characteristics of whole spot position control
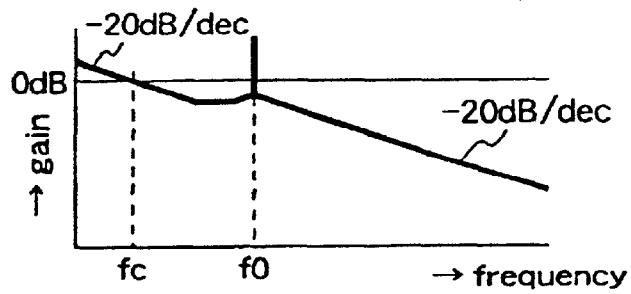

Fig.20 (d) open-loop phase characteristics 181 witout spot position loop filter 111 and phase characteristics 182 of spot position loop filter 111
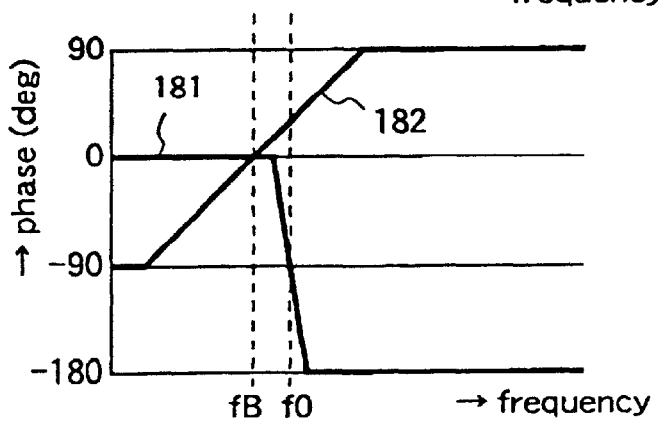

Fig.20 (e) phase characteristics of whole spot position control
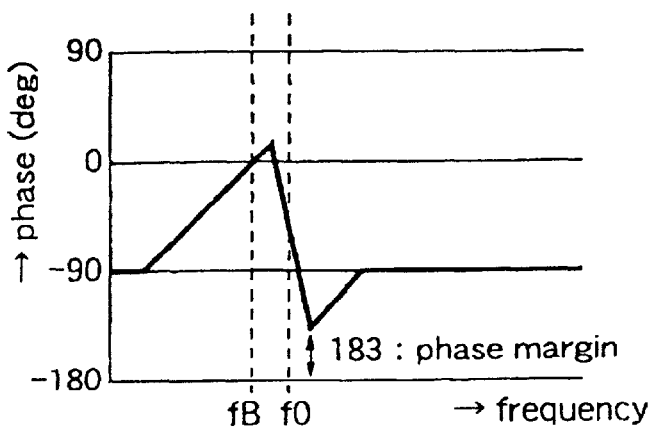

OPTICAL DISK APPARATUS HAVING COMPENSATION FOR OBJECTIVE LENS DISLOCATION

FIELD OF THE INVENTION

The present invention relates to an optical disc apparatus which applies a light spot to an optical disc, thereby to record or reproduce information.

BACKGROUND OF THE INVENTION

In recent years, optical disc apparatuses which applies a light spot to an optical disc thereby to record or reproduce information, such as a CD (Compact Disc) or MD (Mini Disc) have been developed. The optical disc has tracks on/from which the information is recorded/reproduced and the optical disc apparatus records/reproduces the information by making the light spot follow the tracks. The tracks are arranged concentrically or helically at intervals of several micrometers (1.6 $\mu$m in the case of CD or MD) in its radial direction. The optical disc apparatus has light spot moving means for moving the light spot in a radial direction of the optical disc at high speed and with high precision, to follow these microscopic tracks. As examples of the light spot moving means, a tracking actuator for radially moving an objective lens which focuses a light spot, and a galvanomirror for changing an angle of an incident light to the objective lens are cited. However, only with such light spot moving means, a movement range of the light spot is limited by the size of the tracking actuator or the objective lens or the like and accordingly the movement range is small. Therefore, the optical disc apparatus usually includes traverse moving means for radially moving an optical head itself which internally contains the objective lens. Generally, control for making the light spot follow the tracks by using the light spot moving means is called "tracking control" and control for making the optical head follow the movement of the light spot by using the traverse moving means is called "traverse control".

In addition, in the conventional traverse control, a difference between the objective lens position and the center of the optical head is generated as an error signal, thereby to perform the control by using this error signal. A method in which a low-band component of a tracking driving signal supplied to the tracking actuator is used as the error signal is widely adopted. The low-band component of the tracking driving signal shows displacement of the objective lens by the tracking control, on the basis of a position where weight and gravity of the objective lens is balanced. When the moving direction of the tracking actuator is horizontal, it is a signal corresponding to a relative position of the objective lens and the center of the optical head, because the displacement of the objective lens by the gravity from the operation center of the tracking actuator in contrast to the moving direction of the tracking actuator is approximately "0" in this case. However, when the position of the apparatus is set up so as to have a vertical moving direction of the tracking actuator, i.e., when the optical disc apparatus is positioned "longitudinally (vertically)", the objective lens is displaced downwardly due to its weight, which is referred to as "self-weight dislocation". The position of the objective lens displaced due to the self-weight dislocation is the position where the weight and gravity of the objective lens is balanced, and the traverse control is executed with this position as a center. Therefore, in the conventional optical disc apparatus, when the self-weight dislocation occurs, the movable range of the tracking actuator is narrowed accordingly, whereby the follow-up characteristics of the tracking control are deteriorated.

Japanese Published Patent Application No.Hei.9-223320 discloses an optical disc apparatus which solves such problems. The optical disc apparatus disclosed therein comprises spot position signal generation means for generating a spot position signal which indicates relative displacement of a light receiving element in the optical head and a light spot, and has a structure of using the spot position signal as an error signal of the traverse control. According to this structure, the traverse control of this optical disc apparatus has a point where the spot position signal is zero as a control target and moves the optical head such that the light spot is positioned at the center of the light receiving element. In constituting the optical head, the center of the light receiving element and the operation center of the tracking actuator are previously arranged so as to coincide with each other. Therefore, the objective lens is always moved around the operation center of the tracking actuator, thereby avoiding the deterioration of the follow-up characteristics of the tracking control.

However, so constructed optical disc apparatus has a problem in stability of the operation at the starting of the operation of the traverse control means. FIG. 14 is a waveform chart showing waveforms of a spot position signal and a traverse driving signal in the conventional optical disc apparatus when theself-weight dislocation occurs. In FIG. 14, at an operation start time 1301 of the traverse control means, the objective lens is displaced due to the self-weight dislocation and the spot position signal has a large value A. When the spot position signal is input to the traverse control means in such a state to start the traverse control, a driving signal 1302 applied to a traverse motor has a high amplitude and becomes oscillatory. In the worst case, when the optical head is moved by the traverse motor, the tracking control is taken off. This is because the frequency band of the traverse control is usually limited to several Hertz or less so as not to follow the eccentricity, the traverse motor has large inertia and it is difficult to be moved or stopped, and the like.

SUMMARY OF THE INVENTION

It is an object of the present invention to provide an optical disc apparatus which allows operation of traverse control means by a spot position signal, even when the self-weight dislocation of an objective lens occurs due to variation in the position of the optical disc apparatus.

Other objects and advantages of the present invention will become apparent from the detailed description and specific embodiments described are provided only for illustration since various additions and modifications within the spirit and scope of the invention will be apparent to those of skill in the art from the detailed description.

According to a 1st aspect of the present invention, an optical disc apparatus which applies a light spot to an optical disc, thereby to record or reproduce information on or from the optical disc, comprises: first moving means for moving the light spot applied to the optical disc, in a radial direction of the optical disc; an optical head having converging means for converging the light spot on the optical disc; spot position detection means for generating a spot position signal which indicates a positional difference in a radial direction of the optical disc, between a center of the optical head and the light spot on the optical head; first control means for subjecting the spot position signal to a first processing by a spot position loop filter, and outputting the spot position signal to the first moving means; second moving means for moving the optical head in a radial direction of the optical disc; second control means for subjecting the spot position signal to a second processing by a traverse loop filter, and outputting the spot position signal to the second moving means; and system operation control means for operating the first control means, and thereafter operating the second control means. Therefore, even when the self-weight dislocation occurs in the objective lens, the traverse control using the spot position signal can be performed with stability, thereby realizing an optical disc apparatus which is considerably effective in practical use, particularly as a portable optical disc apparatus.

According to a 2nd aspect of the present invention, an optical disc apparatus which applies a light spot to an optical disc, thereby to record or reproduce information on or from the optical disc, comprises: first moving means for moving the light spot applied to the optical disc, in a radial direction of the optical disc; an optical head having converging means for converging the light spot on the optical disc; spot position detection means for generating a spot position signal which indicates a positional difference in a radial direction of the optical disc, between a center of the optical head and the light spot on the optical head; first control means for subjecting the spot position signal to a first processing by a spot position loop filter, and outputting the spot position signal to the first moving means; second moving means for moving the optical head in a radial direction of the optical disc; second control means for subjecting the spot position signal to a second processing by a traverse loop filter, and outputting the spot position signal to the second moving means; spot position signal monitoring means for receiving the spot position signal as an input, and outputting a first signal which indicates that the spot position signal comes to a value smaller than a prescribed value; and system operation control means for operating the first control means when the first signal is input, and operating the second control means after or simultaneously with the operation of the first control means. Therefore, the execution time for the spot position control precedent to the traverse control can be optimized and minimized, thereby realizing an optical disc apparatus which is considerably effective in practical use, particularly as a portable optical disc apparatus.

According to a 3rd aspect of the present invention, an optical disc apparatus which applies a light spot to an optical disc, thereby to record or reproduce information on or from the optical disc, comprises: first moving means for moving the light spot applied to the optical disc, in a radial direction of the optical disc; an optical head having converging means for converging the light spot on the optical disc; spot position detection means for generating a spot position signal which indicates a positional difference in a radial direction of the optical disc, between a center of the optical head and the light spot on the optical head; correction signal generation means for receiving the spot position signal as an input, and generating a correction signal for correcting the spot position signal; subtracting means for subtracting the correction signal from the spot position signal; second moving means for moving the optical head in a radial direction of the optical disc; and second control means for subjecting an output from the subtracting means to a processing by a traverse loop filter, and outputting the output to the second moving means. Therefore, the traverse control can be stabilized with a simple structure without using the spot position control, thereby realizing an optical disc apparatus which is considerably effective in practical use, particularly as a portable optical disc apparatus.

According to a 3rd aspect of the present invention, an optical disc apparatus which applies a light spot to an optical disc, thereby to record and reproduce information on or from the optical disc, comprises: first moving means for moving the light spot applied to the optical disc, in a radial direction of the optical disc; an optical head having converging means for converging the light spot on the optical disc; spot position detection means for generating a spot position signal which indicates a positional difference in a radial direction of the optical disc, between a center of the optical head and the light spot on the optical head; second moving means for moving the optical head in a radial direction of the optical disc; second control means for subjecting the spot position signal to a processing by a traverse loop filter, and outputting the spot position signal to the second moving means; and a coefficient multiplier for reducing a coefficient for the control by the second control means to a value smaller than that in a normal operation time, at starting of the operation of the second control means. Therefore, the traverse control can be stabilized with a simple structure without using the spot position control, thereby realizing an optical disc apparatus which is considerably effective in practical use, particularly as a portable optical disc apparatus.

According to a 5th aspect of the present invention, in the optical disc apparatus of the 1st or 2nd aspect, the first processing subjected by the first control means is a phase-lag compensation. According to the 5th aspect, the first processing to be performed to the spot position signal comprises only the phase-lag processing, i.e., low-band compensation processing, whereby the structure of the spot position filter can be simplified. Therefore, even when the self-weight dislocation occurs in the objective lens, the traverse control using the spot position signal can be performed with stability, or the execution time of the spot position control precedent to the traverse control can be optimized and minimized, thereby realizing an optical disc apparatus which is considerably effective in practical use, particularly as a portable optical disc apparatus.

According to a 6th aspect of the present invention, in the optical disc apparatus of the 5th aspect, the first processing subjected by the first control means includes compensation for reducing an open-loop gain at a primary resonance frequency of the first moving means, in addition to the phase-lag compensation. Therefore, even when the open-loop gain at the primary resonance frequency exceeds 0 dB, the phase margin can be secured and the spot position control is stabilized.

According to a 7th aspect of the present invention, in the optical disc apparatus of the 1st or 2nd aspect, the first processing subjected by the first control means is a phase-lead compensation and a phase-lag compensation, and the phase-lead compensation is started from a frequency lower than a primary resonance frequency of the first moving means. According to the 7th aspect, both of the phase-lead compensation and the phase-lag compensation, i.e., phase compensation and low-band compensation are performed as the first processing to be performed to the spot position signal. Accordingly, the oscillations can be suppressed in a low frequency band in the servo of the spot position control, according to the spot position signal having a sensitivity which cannot be increased. Therefore, even when the self-weight dislocation occurs in the objective lens, the traverse control using the spot position signal can be performed with stability, or the execution time for the spot position control precedent to the traverse control can be optimized and minimized, thereby realizing an optical disc apparatus which is considerably effective in practical use, particularly as a portable optical disc apparatus.

According to a 8th aspect of the present invention, an optical disc apparatus which applies a light spot to an optical disc, thereby to record or reproduce information on or from the optical disc, comprises: first moving means for moving the light spot applied to the optical disc, in a radial direction of the optical disc; an optical head having converging means for converging the light spot on the optical disc; spot position detection means for generating a spot position signal which indicates a positional difference in a radial direction of the optical disc, between a center of the optical head and the light spot on the optical head; tracking error detection means for generating a tracking error signal which indicates a positional dislocation between the light spot and a track on the optical disc; first control means for subjecting the spot position signal or the tracking error signal to a first processing by a phase compensation loop filter, and outputting the signal to the first moving means; second moving means for moving the optical head in a radial direction of the optical disc; second control means for subjecting the spot position signal to a second processing by a traverse loop filter, and outputting the signal to the second moving means; and system operation control means for operating the first control means to perform a phase-lag compensation and a phase-lead compensation by the phase compensation loop filter to the spot position signal, thereafter switching the spot position signal to the tracking error signal to perform the phase-lag compensation and the phase-lead compensation to the tracking error signal, and operating the second control means after operating the first control means. Therefore, even when the self-weight dislocation occurs in the objective lens, the traverse control using the spot position signal can be performed with stability. Besides, a loop filter can be commonly used for performing the phase-lead compensation and the phase-lag compensation in performing the spot position control and the tracking error control. Therefore, an optical disc apparatus which is considerable effective in practical use, particularly as a portable optical disc apparatus, can be obtained.

BRIEF DESCRIPTION OF THE DRAWINGS

FIG. 18 are diagrams showing loop characteristics of spot position control, FIG. 18($a$) being a diagram showing open-loop gain characteristics without a spot position loop filter, FIG. 18($b$) being a diagram showing gain characteristics of the spot position loop filter, FIG. 18($c$) being a diagram showing open-loop characteristics of the whole spot position control, FIG. 18($d$) being a diagram showing gain characteristics of a changed spot position loop filter, and FIG. 18($e$) being a diagram showing open-loop characteristics of the whole changed spot position control.

FIG. 19 are diagrams showing loop-characteristics of spot position control, FIG. 19($a$) being a diagram showing open-loop gain characteristics without a spot position loop filter, FIG. 19($b$) being a diagram showing a gain characteristics of the spot position loop filter, FIG. 19($c$) being a diagram showing open-loop characteristics of the whole spot position control, FIG. 19($d$) being a diagram showing gain characteristics of a spot position loop filter, and FIG. 19($e$) being a diagram showing open-loop characteristics of the whole spot position control.

FIG. 20 are diagrams showing loop characteristics of spot position control, FIG. 20($a$) being a diagram showing open-loop gain characteristics without a spot position loop filter 111, FIG. 20($b$) being a diagram showing gain characteristics of the spot position loop filter 111, FIG. 20($c$) being a diagram showing open-loop characteristics of the whole spot position control, FIG. 20($d$) being a diagram showing open-loop phase characteristics without the spot position loop filter 111 and phase characteristics of the spot position loop filter 111, in the spot position control loop, and FIG. 20($e$) being a diagram showing phase characteristics of the whole spot position control loop.

DETAILED DESCRIPTION OF THE PREFERRED EMBODIMENTS

Hereinafter, embodiments of the present invention will be described with reference to the drawings.

Embodiment 1.

A first embodiment of the present invention will be described with reference to FIGS. 1, 2, 3, and 15.

The first embodiment corresponds to claims 1, 5, 6 and 7, and it allows the traverse control by executing spot position control beforehand, even when the self-weight dislocation occurs in an objective lens in a radial direction of an optical disc.

Figure 1:
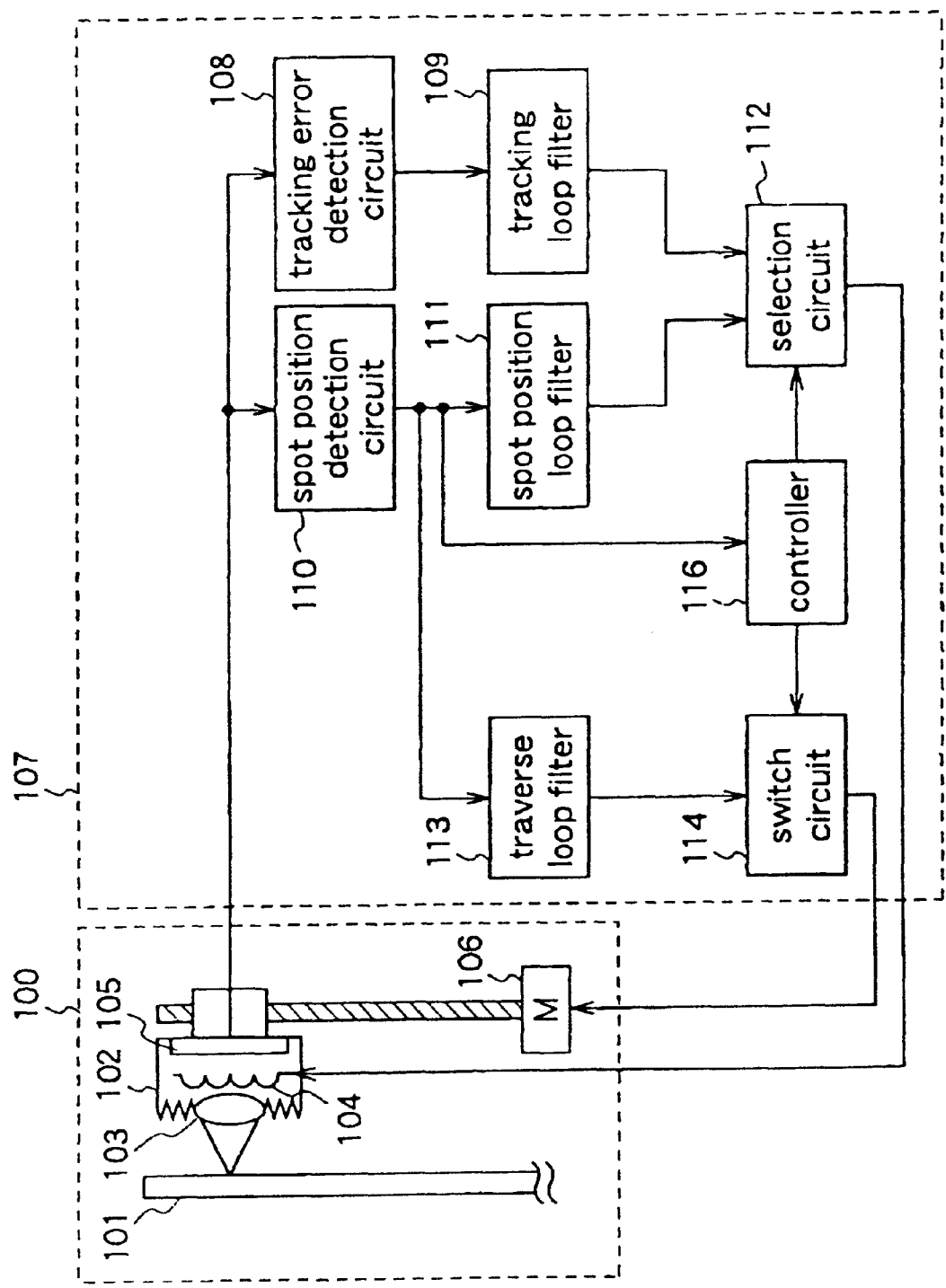
FIG. 1 is a block diagram illustrating an optical disc apparatus according to a first embodiment of the present invention.
Figure 2:
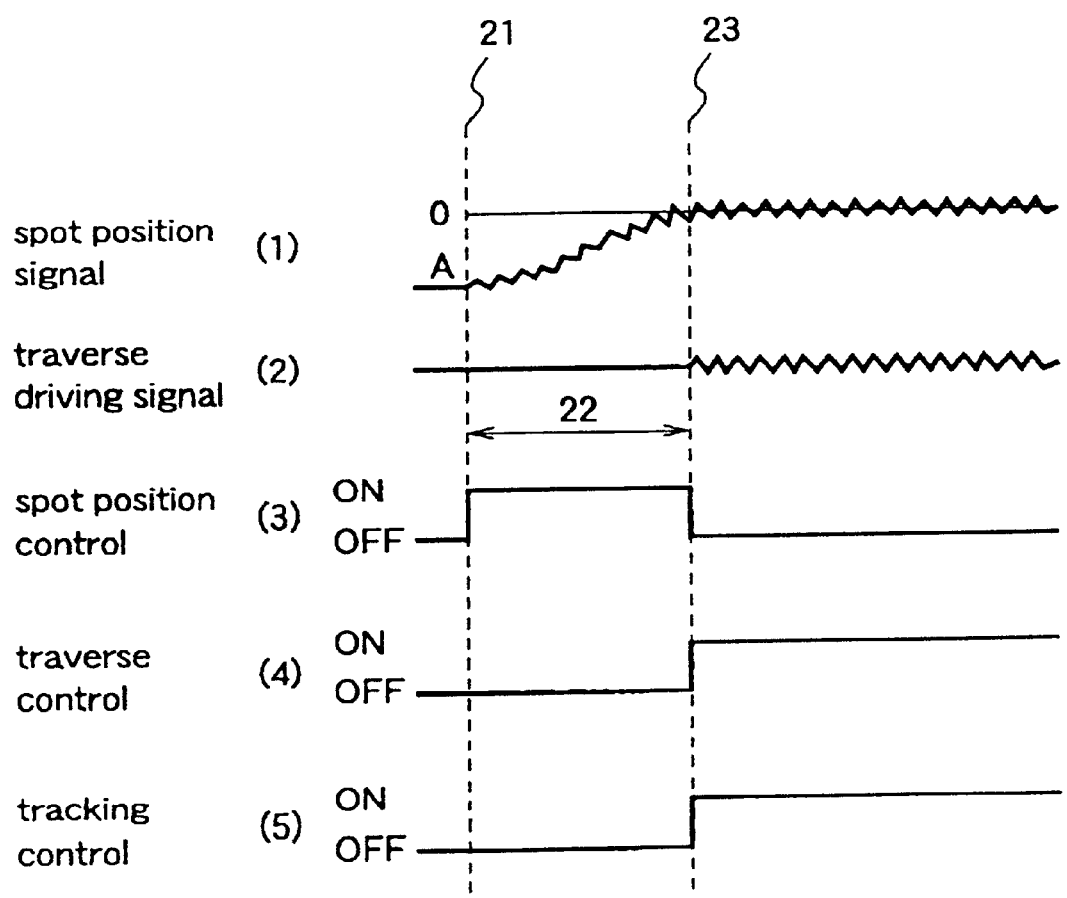
FIG. 2 is a waveform chart showing operations according to the first embodiment.
Figure 3:
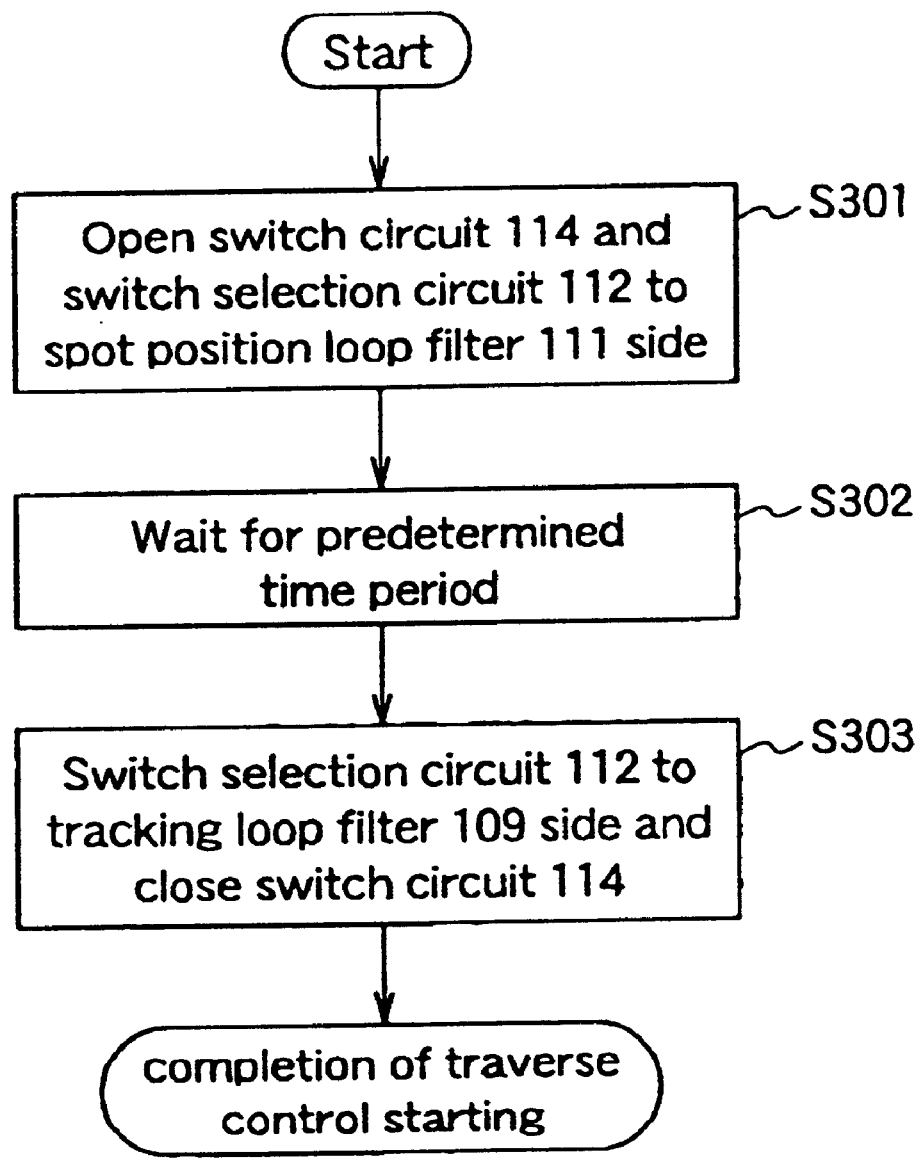
FIG. 3 is a flowchart showing processings by a controller 116 in the first embodiment.

FIG. 1 is a block diagram illustrating an optical disc apparatus according to the first embodiment. FIG. 2 is a waveform chart showing operations according to the first embodiment. FIG. 3 is a flowchart showing processings by a controller 116 in the first embodiment.

In FIG. 1, reference numeral 100 denotes a mechanism unit. In this mechanism unit 100, numeral 101 denotes an optical disc having concentric or helical tracks, on or from which information is recorded or reproduced. Numeral 102 denotes an optical head, internally containing an objective lens 103 as converging means for converging a light spot on the optical disc 101, a tracking actuator 104 as first moving means, for moving the objective lens 103 in a radial direction of the optical disc 101, and a light receiving element 105 for converting a light reflected on the optical disc 101 into an electric signal. Numeral 106 denotes a traverse motor as second moving means, for moving the optical head 102 in a radial direction of the optical disc in accordance with an output from a switch circuit 114 which is described later.

In addition, numeral 107 denotes a control unit. In this control unit 107, numeral 108 denotes a tracking error detection circuit for generating a tracking error signal which indicates positional displacement between the track on the optical disc 101 and the light spot, from an output of the light receiving element 105. Numeral 109 denotes a tracking loop filter which receives the tracking error signal as input, and outputs the signal after performing phase compensation processing. Numeral 110 denotes a spot position detection circuit as spot position detection means, for generating a spot position signal which indicates a positional difference between the center of the optical head and the light spot on the light receiving element 105, from an output of the light receiving element 105. Numeral 111 denotes a spot position loop filter which receives the spot position signal as input, and outputs the signal after performing the phase compensation processing. Numeral 112 denotes a selection circuit for selecting either of an output of the tracking loop filter 109 and an output of the spot position loop filter 111, in accordance with an instruction of a controller 116, which is described later, and supplying the selected output to the tracking actuator 104. Numeral 113 denotes a traverse loop filter which receives the spot position signal as input, and outputs the signal after performing the phase compensation processing Numeral 114 denotes a switch circuit for switching on/off an output of the traverse loop filter 113, in accordance with an instruction of the controller 116, which is described later. Numeral 116 denotes a controller which receives a detection result of the spot position detection circuit 110 as input, and controls the selection circuit 112 and the switch circuit 114, on the basis of the detection result. This controller 116 constitutes first control means, together with the selection circuit 112. In addition, the controller 116 constitutes second control means, together with the switch circuit 114. Further, the controller 116 constitutes system operation control means for operating the second control means after operating the first control means.

Next, a description is given of an operation of the so constructed optical disc apparatus according to the first embodiment.

When the objective lens 103 experiences gravity in a radial direction of the optical disc, the objective lens 103 is displaced due to the self-weight dislocation. The spot position detection circuit 110 generates a spot position signal on the basis of the displacement amount of the light spot displaced from the center of the light receiving element 105, and outputs the signal. At an initial timing when no control is imposed (see 21 in FIG. 2), the spot position signal has an offset of a value A (A≠0). The optical disc apparatus of the first embodiment controls the position of the objective lens 103 in the following procedure so as to make the value of the spot position signal approximately "0".

The controller 116 opens the switch circuit 114, switches the selection circuit 112 to the side for the spot position loop filter 111 in a state where driving of the traverse motor 106 is stopped, and supplies an output from the spot position loop filter 111 to the tracking actuator 104 (step S301 in FIG. 3). The spot position loop filter 111 receives the spot position signal, and the spot position loop filter 111 controls the position of the objective lens 103 via the tracking actuator 104, so as to have approximately "0" spot position signal, i.e., to position the light spot at the center of the light receiving element 105. Hereinafter, this control which is newly performed is referred to as "spot position control". The displacement amount of the objective lens 103 due to the self-weight dislocation is determined by hardness of a resilient support supporting the objective lens 103 and weight of the objective lens 103. Further, a time period from when the spot position control for the determined displacement amount is started until the spot position signal has a value of approximately "0" is determined by characteristics of a servo loop which is constituted by the tracking actuator 104, the spot position detection circuit 110 and the spot position loop filter 111, and it can be previously calculated. The controller 116 waits for the previously calculated time period (see 22 in FIG. 2) until the spot position signal has a value of approximately "0" (step S302 in FIG. 3), switches the selection circuit 112 to the side for the tracking loop filter 109, and closes the switch circuit 114 (step S303 in FIG. 3). When the selection circuit 112 is switched to the side of the tracking loop filter 109, the tracking error signal detected by the tracking error detection circuit 108 is subjected to phase compensation processing by the tracking loop filter 109, then supplied to the tracking actuator 104, and thereby the light spot is controlled so as to follow the tracks on the optical disc through the objective lens 103. When the switch circuit 114 is closed, the spot position signal which is subjected to the phase compensation by the traverse loop filter 113 is supplied to the traverse motor 106, and thereby the optical head 102 is moved to a position where the spot position signal has an approximately "0" value. At starting of the traverse control (see 23 in FIG. 2), since the spot position signal has an approximately "0" value because of the spot position control executed beforehand, the traverse driving signal does not oscillate unlike that shown in the prior art. Therefore, the traverse control having a control object of positioning the light spot near the center of the light receiving element 105 (≈near the center of the optical head 102) can be started with stability.

A more detailed description is given of the spot position loop filter 111. The spot position control in the first embodiment is realized by a control loop comprising the tracking actuator 104, the spot position detection circuit 110, the spot position loop filter 111, and the selection circuit 112. This control system is a closed-loop feedback control system. FIG. 15(a) schematically shows gain characteristics of elements except the spot position loop filter 111. As shown in FIG. 15(a), it does not have frequency characteristics at frequencies lower than a primary resonance frequency f0 and has characteristics that the gain is decreased by −40 dB/dec at frequencies higher than f0. The characteristics shown in FIG. 15(a) are seen in a control target having a structure for supporting the objective lens 103 by a resilient support such as a spring. When the control is to be performed to such a control target, it is effective to perform phase compensation by a differential operation, i.e., phase-lead compensation, in addition to the phase-lag compensation. That is, as shown in FIG. 15(b), when the spot position loop filter 111 has characteristics of 20 dB/dec (phase-lead compensation) and −20 dB/dec (phase-lag compensation) and the inclination in the vicinity of the gain crossover frequency fc in the whole open-loop characteristics (see FIG. 15(c)) is −20 dB/dec, the control system can be stabilized.

Figure 16:
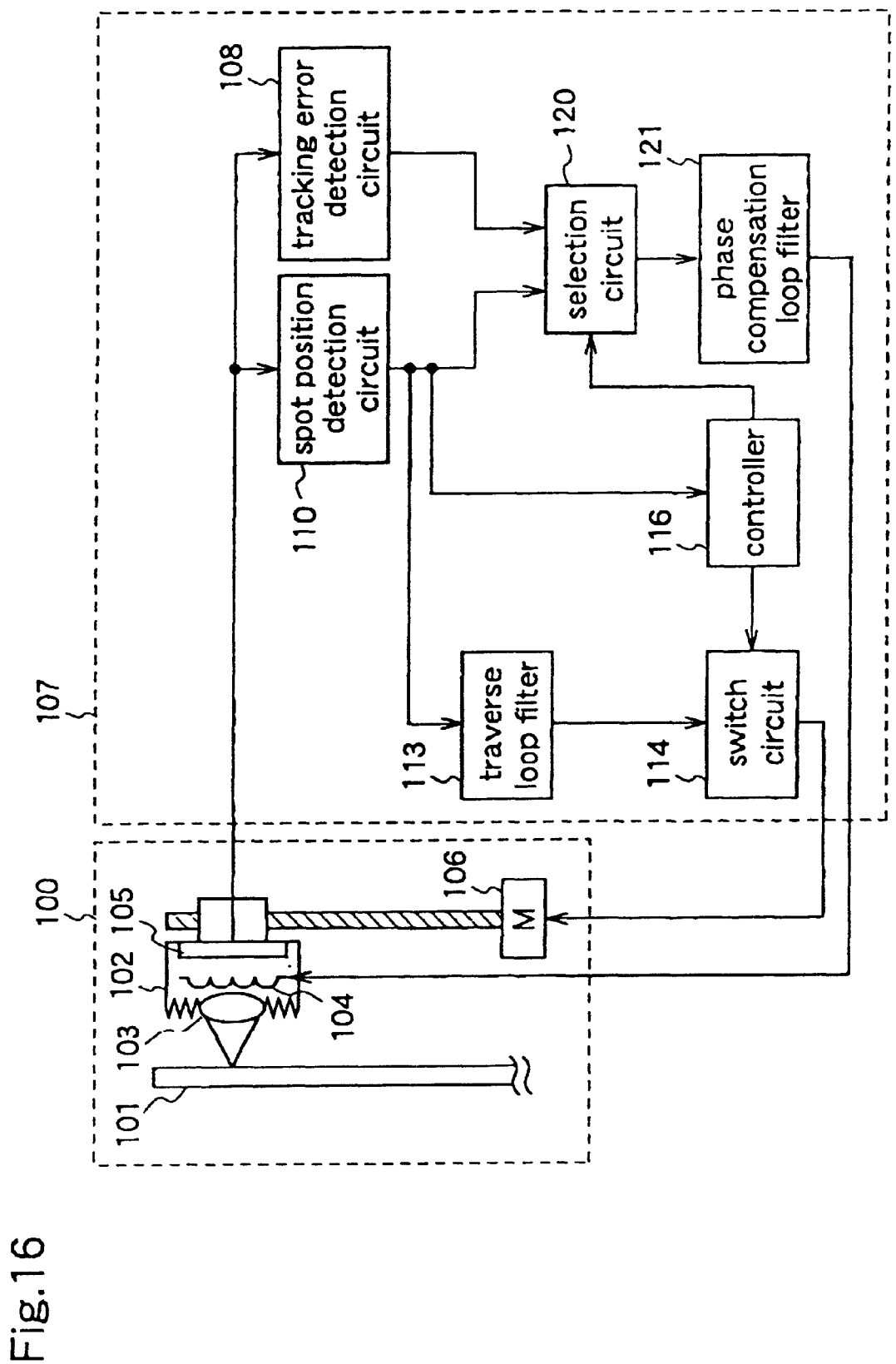
FIG. 16 is a block diagram illustrating an optical disc apparatus according to another example of the first embodiment.

Since the control target is the same tracking actuator 104, characteristics required in the tracking loop filter 109 are approximately similar to those shown in FIG. 15(b). Therefore, loop filters can be commonly used by using the spot position loop filter 111 and the tracking loop filter 109 exclusively FIG. 16 is a block diagram illustrating an optical disc apparatus according to the first embodiment, which is constructed as described above. In FIG. 16, numerals 100–108, 110, 113, and 114 denote elements of the same numerals as those shown in FIG. 1. Numeral 120 denotes a selection circuit for selecting either of an output from the tracking error detection circuit 108 and an output from the spot position detection circuit 110 in accordance with an instruction of a controller 116, which is described later, and supplying the selected output to a phase compensation loop filter 121 Numeral 121 denotes a phase compensation loop filter which has V-shaped gain characteristics and performs phase-lag compensation in a low band and phase-lead compensation in a high band to the tracking error signal or spot position signal selected by the selection circuit 120. Numeral 116 denotes a controller which receives a detection result of the spot position detection circuit 110 as an input, and controls the selection circuit 120 and the switch circuit 114 on the basis of the detection result. This controller 116 constitutes first control means together with the selection circuit 120. In addition, the controller 116 constitutes second control means together with the selection circuit 120. Further, this controller 116 constitutes system operation control means for operating the first control means, and thereafter operating the second control means.

According to the structure shown in FIG. 16, a loop filter having the same gain characteristics as the spot position loop filter 111 as shown in FIG. 15(b) is provided as the phase compensation loop filter 116. Then, the controller 116 executes the control such that the selection circuit 120 inputs the spot position signal initially to the phase compensation loop filter 116, and switches the input for the phase compensation loop filter 116 to the tracking error signal when the spot position control is almost completed. Accordingly, the spot position loop filter 111 and the tracking loop filter 119 in FIG. 1 can be commonly used.

When sensitivity of the spot position signal and the tracking error signal is extremely different from each other, the characteristics of the spot position loop filter 111 and the tracking loop filter 109 should be differentiated. In a CD or MD, while the track pitch is 1.6 μm, the movable range of the objective lens 103 is hundreds μm. Therefore, in the case of the same signal amplitude, the sensitivity of the spot position signal is less than one hundredth of that of the tracking error signal. When the open-loop characteristics shown in FIG. 15(c) are to be realized in both of the tracking control loop and the spot position control loop, the gain of the spot position loop filter 111 is required to be more than one hundred times as large as that of the track position loop filter 109, and this is not realistic. Therefore, in such a case, it is effective to make the gain crossover frequency fc lower than the primary resonance frequency f0 and make the spot position loop filter have the characteristics shown in FIG. 17(b). In this case, as shown in FIG. 17(c) showing the whole open-loop characteristics, the gain characteristics in the vicinity of the gain crossover frequency can be set at −20 dB/dec. For example in a stationary optical disc apparatus, since the direction of the self-weight dislocation is fixed, the control band of the spot position control is not required to be enhanced and therefore this method is particularly effective. Further, advantageously, this method can be easily realized by a simple filter of −20 dB/dec.

When the spot position loop filter 111 is constituted using the filter of −20 dB/dec, attention should be given to a gain at the primary resonance frequency f0, i.e., a resonance point. When the gain at the resonance point is large, a part having the gain more than 0 dB occurs at frequencies higher than the gain crossover frequency fc as shown in FIG. 18(c), whereby the spot position control becomes unstable. To solve this problem, it is effective to make the spot position loop filter 111 have the characteristics of reducing the gain at high frequencies, as shown in FIG. 18(d). Accordingly, the open-loop gain in excess of 0 dB at the resonance point can be avoided as shown in FIG. 18(e), whereby the spot position control can be stabilized.

Figure 17:
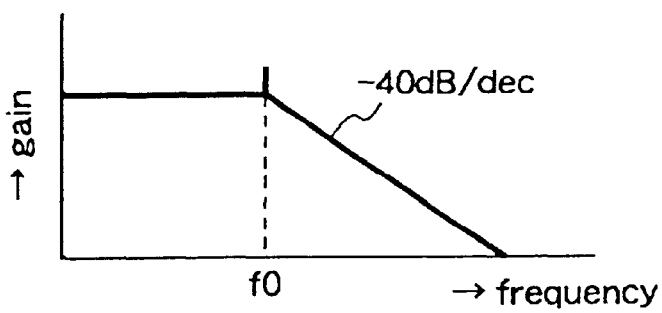
FIG. 17 are diagrams showing loop characteristics of spot position control, FIG. 17($a$) being a diagram showing open-loop gain characteristics without a spot position loop filter, FIG. 17($b$) being a diagram showing gain characteristics of the spot position loop filter, and FIG. 17($c$) being a diagram showing open-loop characteristics of the whole spot position control.
Figure 17:
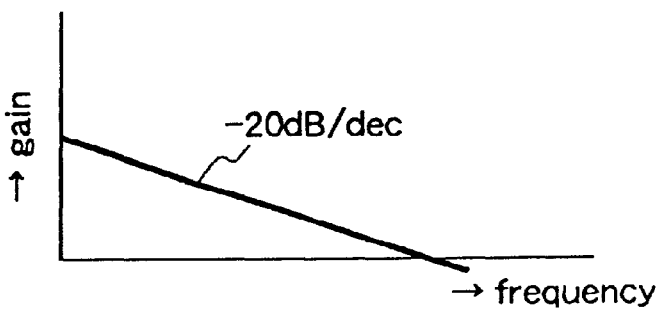
Figure 17:
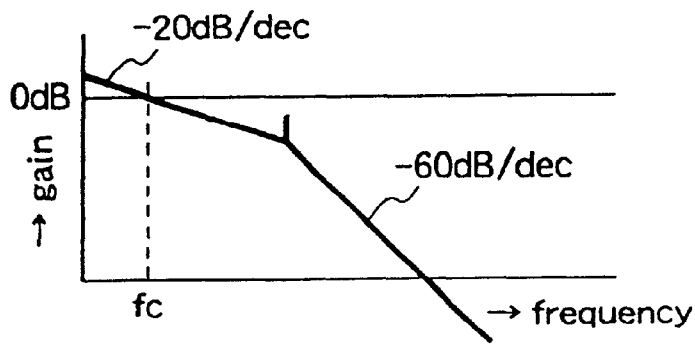

When the spot position control is executed using the spot position signal having a low sensitivity, by using the phase-lead compensation as described with reference to FIG. 17, it is effective to start the phase-lead compensation from a frequency lower than the primary resonance frequency f0, as shown in FIG. 19(d). By doing so, even when the open-loop gain exceeds 0 dB at the resonance point, a phase margin can be secured, thereby stabilizing the spot position control.

With regard to this point, a detailed description is given with reference to the drawings. FIG. 20(a) shows open-loop gain characteristics without the spot position loop filter 111, FIG. 20(b) shows gain characteristics of the spot position loop filter 111, FIG. 20(c) shows open-loop gain characteristics of the whole spot position control loop, FIG. 20(d) shows open-loop phase characteristics without the spot position loop filter 111 and phase characteristics of the spot position loop filter in the spot position control loop, and FIG. 20(e) shows phase characteristics of the whole spot position control loop. In the figures, f0 denotes a primary resonance frequency and fB denotes a frequency at which phase-lead compensation is started. Numeral 181 denotes open-loop phase characteristics without the spot position loop filter 111. Numeral 182 denotes phase characteristics of the spot position loop filter. Numeral 183 denotes a phase margin for the spot position control.

The phase characteristic 181 of elements except the spot position loop filter 111 is 0 degree at a frequency band lower than the primary resonance frequency f0 and thereafter abruptly decreased up to −180 degree, passing through a point of about −90 degree at the primary resonance frequency f0. On the other hand, the phase characteristic 182 of the spot position loop filter 111 is about 0 degree at the phase-lead compensation starting frequency fB, −90 degree at a frequency band sufficiently lower than fB, and +90 degree at a frequency band sufficiently higher than fB. The phase characteristic of the whole loop can be obtained by adding these characteristics, which is shown in FIG. 20(e). That is, the phase-lead compensation is started from the frequency band lower than that in the vicinity of the primary resonance frequency f0 where the phase is abruptly decreased to −180 degree (i.e., phase margin of 0), whereby the phase margin 183 can be secured and the spot position control can be stabilized.

While this method slightly complicates the structure of the spot position loop filter 111, it is resistant to variation in the open-loop gain at the resonance point, more specifically, variation in the gain of the tracking actuator 104 at the primary resonance frequency f0, and it can enhance the gain crossover frequency fc with relative to that in a case where the phase-lead compensation is not performed, thereby obtaining a quicker response. Generally, the gain of the tracking actuator 104 at the primary resonance frequency f0 varies according to the weight of the objective lens 103, hardness of a spring which supports the objective lens, hardness of adhesive which is used for fixing the spring to the optical head 102, and the like. Therefore, it is difficult to reduce the variations. Accordingly, the present method which can accommodate the variations is effective in practical use. In addition, by providing a mechanism for switching the frequency where the phase-lead compensation is started, for example by switching a tap to the spot position loop filter 111, the spot position loop filter 111 can be commonly used with the tracking loop filter 109. In this case, the complicated structure of the spot position loop filter 111 presents no problem any more.

Here, it is desirable that the switching of the selection circuit 112 to the side for the tracking loop filter 109 is completed before or simultaneously with the closing of the switch circuit 114. As described above, the output of the tracking loop filter 109 has a function of fixing the position of the light spot to the track on the optical disc 101. However, when the switch circuit 114 is closed in a state where this control is not performed, while the optical head 102 is moved according to the spot position signal, the light receiving element 105, the tracking actuator 104 and the objective lens 103 are moved together with the optical head 102. Therefore, the spot position signal is not reduced and thus there is a risk of the optical head 102 mechanically continuing to move until the movable limit. In this first embodiment, since the light spot is fixed to the track as described above, the traverse control using the spot position signal is realized.

As described above, the apparatus according to the first embodiment performs the spot position control, corrects the self-weight dislocation of the objective lens 103 occurring in the radial direction of the disc, and thereafter performs the traverse control. Thereby, even in a case where the self-weight dislocation occurs according to the position of the apparatus, the traverse control using the spot position signal can be performed with stability.

Embodiment 2.

Hereinafter, a second embodiment of the present invention will be described with reference to FIGS. 4, 5, and 6.

The second embodiment corresponds to claims 2, 5, and 6.

In the first embodiment, the fixed time previously calculated (see 22 in FIG. 2) is set as the time period from the starting of the spot position control until the starting of the traverse control. However, the hardness of the resilient support which supports the objective lens 103 or the sensitivity of the tracking actuator 104 for input signals usually have variations. Therefore, in order to operate the apparatus with stability on all conditions, a time period including a longer margin should be set to satisfy the worst condition.

Figure 4:
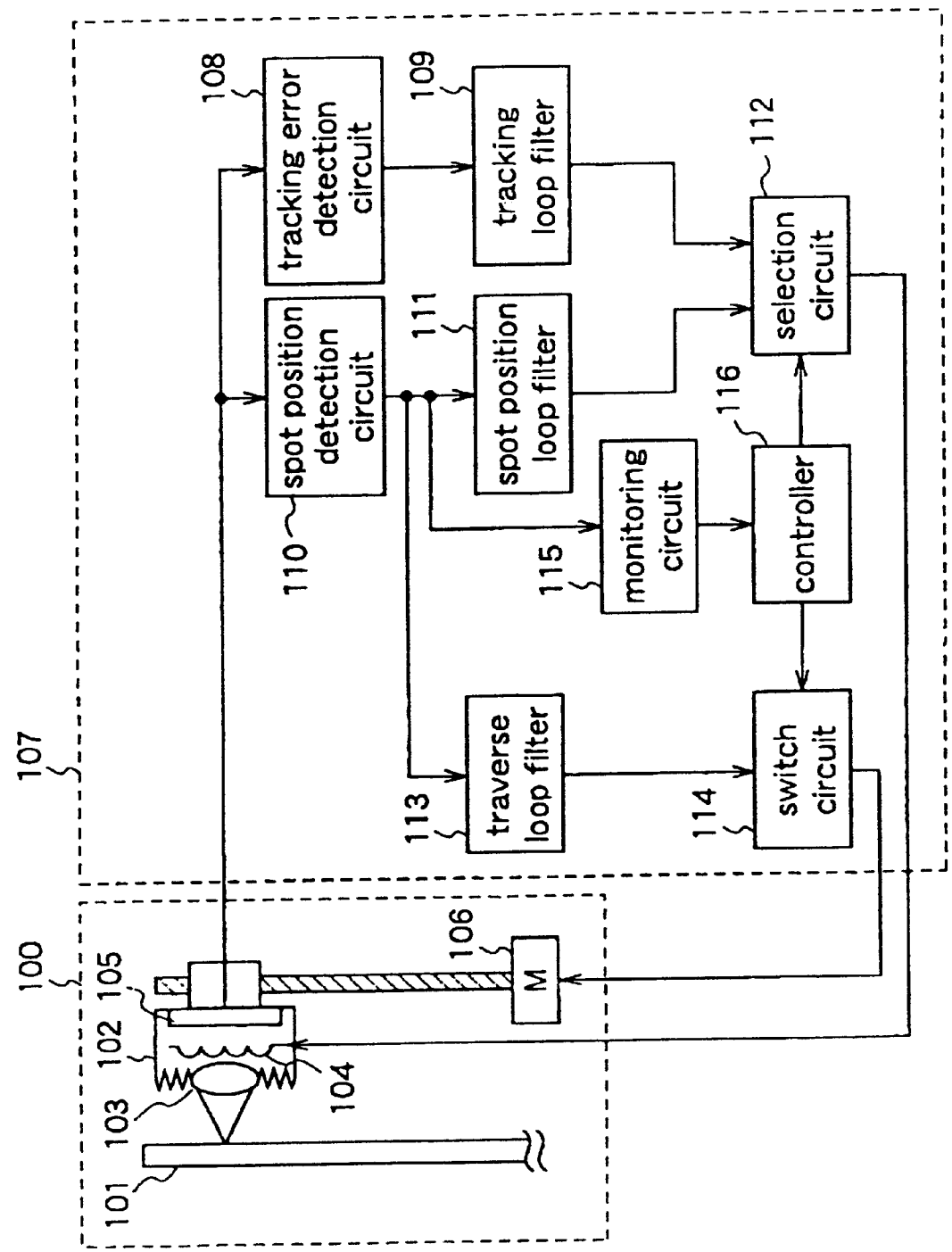
FIG. 4 is a block diagram illustrating an optical disc apparatus according to a second embodiment of the present invention.

In this second embodiment, a monitoring circuit 115 is provided as shown in FIG. 4 and the spot position loop filter 111 is operated during the shortest possible time when oscillations do not occur at the starting of the traverse control, whereby the whole control time can be optimized FIG. 4 is a block diagram illustrating an optical disc apparatus according to the second embodiment. FIG. 5 is a waveform chart showing operations according to the second embodiment. FIG. 6 is a flowchart showing processings by a controller 116 in the second embodiment.

In FIG. 4, reference numeral 100 denotes a mechanism unit. In this mechanism unit 100, numeral 101 denotes an optical disc having concentric or helical tracks, on or from which information is recorded or reproduced. Numeral 102 denotes an optical head, which internally contains an objective lens 103 as converging means for converging a light spot on the optical disc 101, a tracking actuator 104 as first moving means, for moving the objective lens 103 in a radial direction of the optical disc, and a light receiving element 105 for converting a light reflected on the optical disc 101 into an electric signal. Numeral 106 denotes a traverse motor as second moving means, for moving the optical head 102 in a radial direction of the optical disc, in accordance with an output from a switch circuit 114, which is described later.

Numeral 107 denotes a control unit. In this control unit 107, numeral 108 denotes a tracking error detection circuit for generating a tracking error signal which indicates position displacement between the track on the optical disc 101 and the light spot, from an output of the light receiving element 105. Numeral 109 denotes a tracking filter which receives the tracking error signal as input, and outputs the signal after performing phase compensation processing. Numeral 110 denotes a spot position detection circuit as spot position detection means, for generating a spot position signal which indicates a positional difference between the center of the optical head and the light spot on the light receiving element 105, from the output of the light receiving element 105. Numeral 111 denotes a spot position loop filter which receives the spot position signal as input, and outputs the signal after performing the phase compensation processing. Numeral 112. denotes a selection circuit for selecting either of an output from the tracking loop filter 109 and an output from the spot position loop filter 111, in accordance with an instruction of a controller 116, which is described later, and supplying the selected output to the tracking actuator 104. Numeral 113 denotes a traverse loop filter which receives the spot position signal as input, and outputs the signal after performing the phase compensation processing. Numeral 114 denotes a switch circuit for switching on or off the output of the traverse loop filter 113, in accordance with an instruction of the controller 116 which is described later. Numeral 115 denotes a monitoring circuit as spot position signal monitoring means, for judging the size of the spot position signal. Numeral 116 denotes a controller which receives a monitor result of the monitoring circuit 115 as input, and controls the selection circuit 112 and the switch circuit 114 on the basis of the monitor result. This controller 116 constitutes first control means together with the selection circuit 112. In addition, the controller 116 constitutes second control means together with the switch circuit 114. Further, the controller 116 constitutes system operation control means for operating the first control means when it receives a signal indicating that the spot position control is statically determined from the monitoring circuit 115, and operating the second control means after or simultaneously with the operation of the first control means.

Next, a description is given of an operation of the so constructed optical disc apparatus according to the second embodiment.

When the objective lens 103 experiences gravity in a radial direction of the optical disc 101, the objective lens is displaced due to the self-weight dislocation. The spot position detection circuit 110 generates a spot position signal in accordance with the displacement amount of the light spot from the center of the light receiving element 105, and outputs the spot position signal. At an initial timing when no control is imposed (see 41 in FIG. 5), the spot position signal has an offset of a value A (A≠0) The controller 116 opens the switch circuit 114 thereby stopping the driving of the traverse motor 106, and switches the selection circuit 112 to the side for the spot position loop filter 111 to make the value of the spot position signal approximately "0", thereby executing the spot position control (step S501 in FIG. 6). Then, the controller 116 receives the input from the monitoring circuit 115 (step S502 in FIG. 6) The monitoring circuit 115 monitors whether the value of the spot position signal goes into a previously determined range (see 42 in FIG. 5), and judges that the spot position control is statically determined at a timing when the value goes into the predetermined range. The controller 116 judges whether the output of the monitoring circuit 115 indicates that the spot position control is statically determined (step S503 in FIG. 6). When it is judged that the output indicates the static determination, the selection circuit 112 is switched to the side for the tracking loop filter 109 as well as the switch circuit 114 is closed (see 43 in FIG. 5 and step S504 in FIG. 6). At this timing, since the spot position signal has a sufficiently small value, the traverse control is performed without being oscillated. In addition, the execution time of the spot position control. (see 44 in FIG. 5) can be shortened with relative to a case where the monitoring circuit 115 is not used. When it is judged that the spot position control is not statically determined, the controller 116 successively receives the output from the monitoring circuit 115, and judges whether it is statically determined.

It is desirable that a value compared with the spot position signal, which is used by the monitoring circuit 115 to judge the static determination of the spot position control is set to have a value smaller than an operation unit of the traverse motor 106. When the traverse motor 106 is constituted by a motor with brush, this traverse motor 106 often operates with "Cogging unit" as a unit. For example, in a structure where the optical head 102 is moved 40 $\mu$m per 1 Cogging, assuming that the spot position control is statically determined at a timing when the spot position signal goes into a range of about ±40 $\mu$m, this is equivalent to a situation where the error is approximately "0" in the traverse control performed later. Therefore, the turbulence in the traverse control can be avoided.

As described above, the apparatus according to the second embodiment includes the monitoring circuit 115 in addition to the apparatus of the first embodiment and compares the spot position signal with the previously set range, whereby the spot position control can be ensured with stability. Further, the apparatus can optimize and minimize the time period for executing the spot position control (see 44 in FIG. 5) for each execution of the traverse control, thereby obtaining the stable and high-speed operation of the optical disc apparatus.

Figure 5:
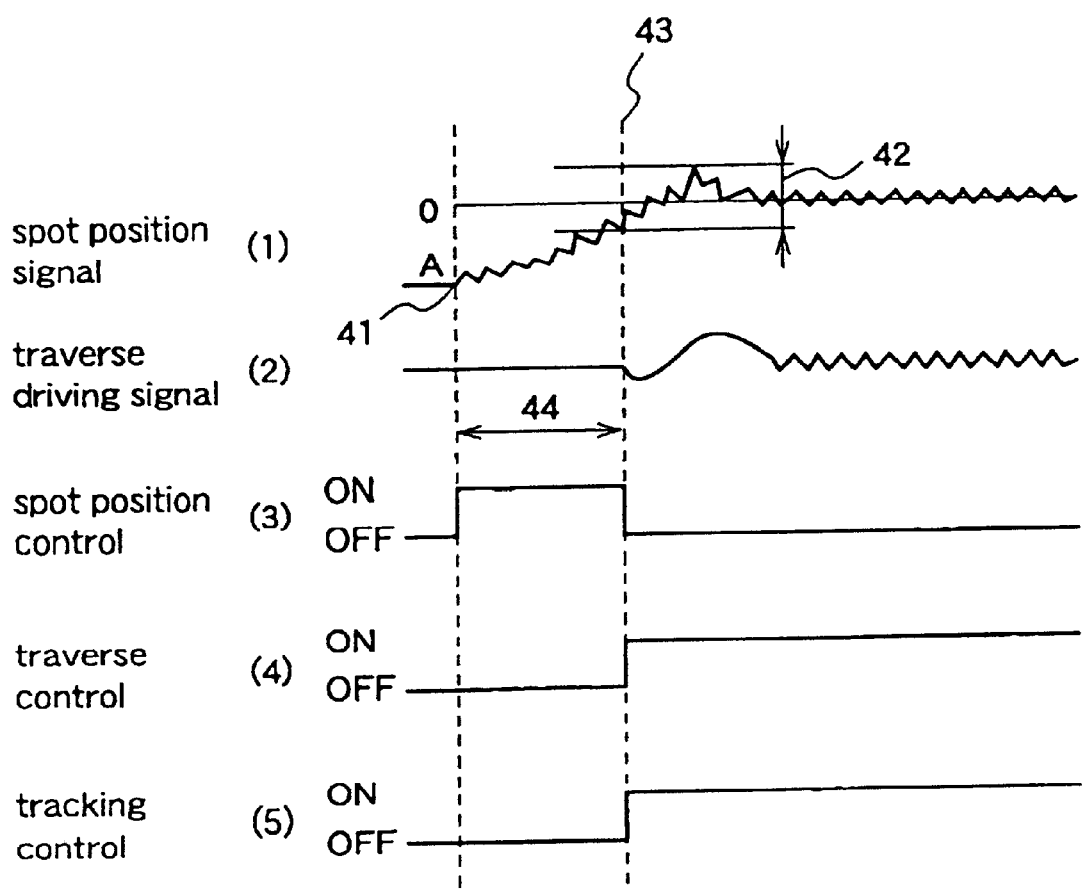
FIG. 5 is a waveform chart showing operations according to the second embodiment.
Figure 6:
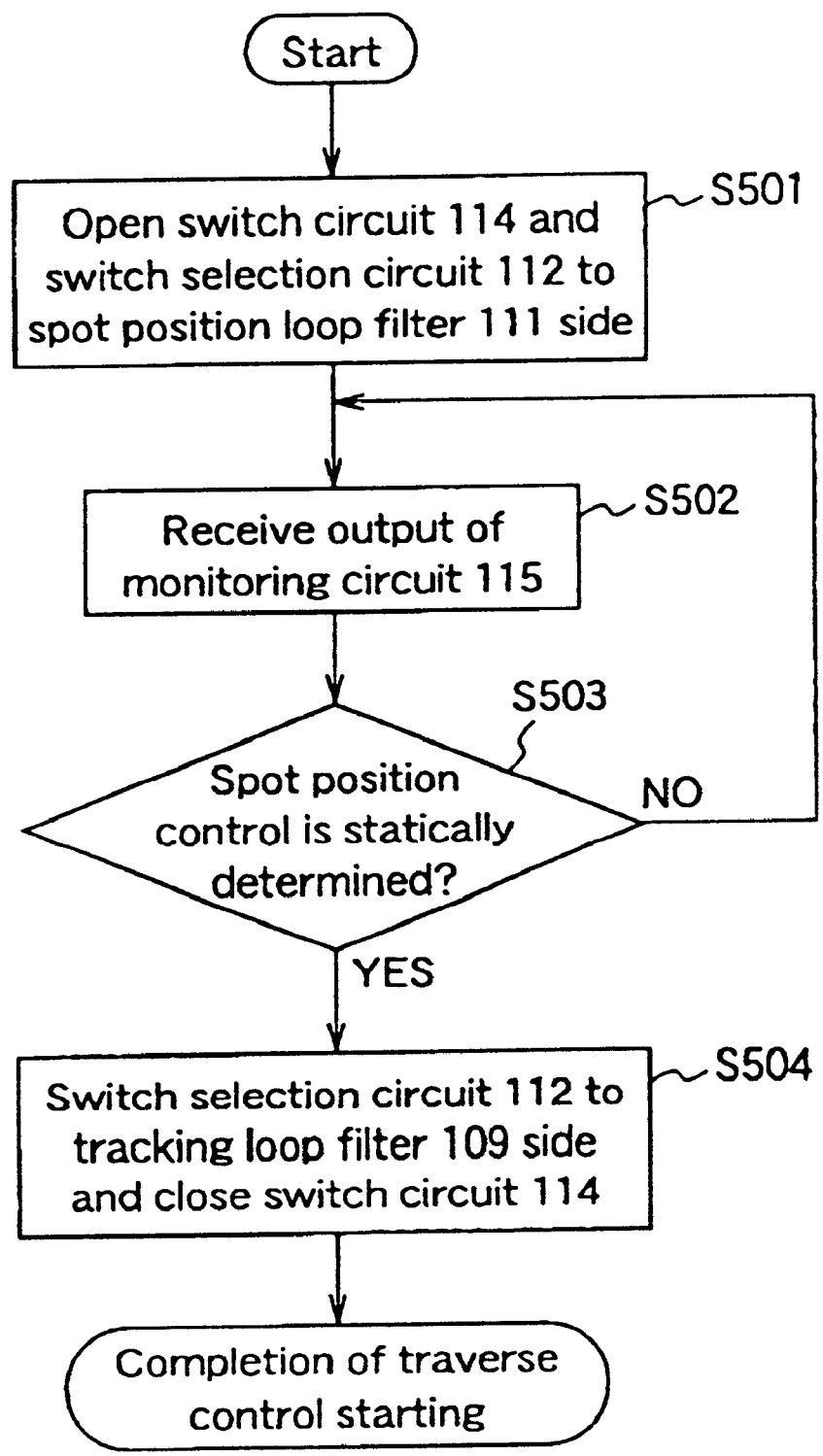
FIG. 6 is a flowchart showing processings by a controller 116 in the second embodiment.

In this second embodiment, the monitoring circuit 115 judges that the spot position control is statically determined, at a timing when the spot position signal goes into the predetermined range (see 42 in FIG. 5). However, any method, such as a method for detecting that a time period when the spot position signal is within a predetermined range is longer than a predetermined time period, or a method for detecting that an average of the spot position signals in a predetermined time period is smaller than a predetermined value, can be utilized, as long as the method substantially detects that the size of the spot position signal is reduced and judges the static determination of the spot position control.

Embodiment 3.

A third embodiment of the present invention will be described with reference to FIGS. 7, 8, 9, and 10.

The third embodiment corresponds to claim 3. This third embodiment controls the size of a spot position signal input to a traverse loop filter also in an initial state, thereby obtaining the stability of the traverse control.

Figure 7:
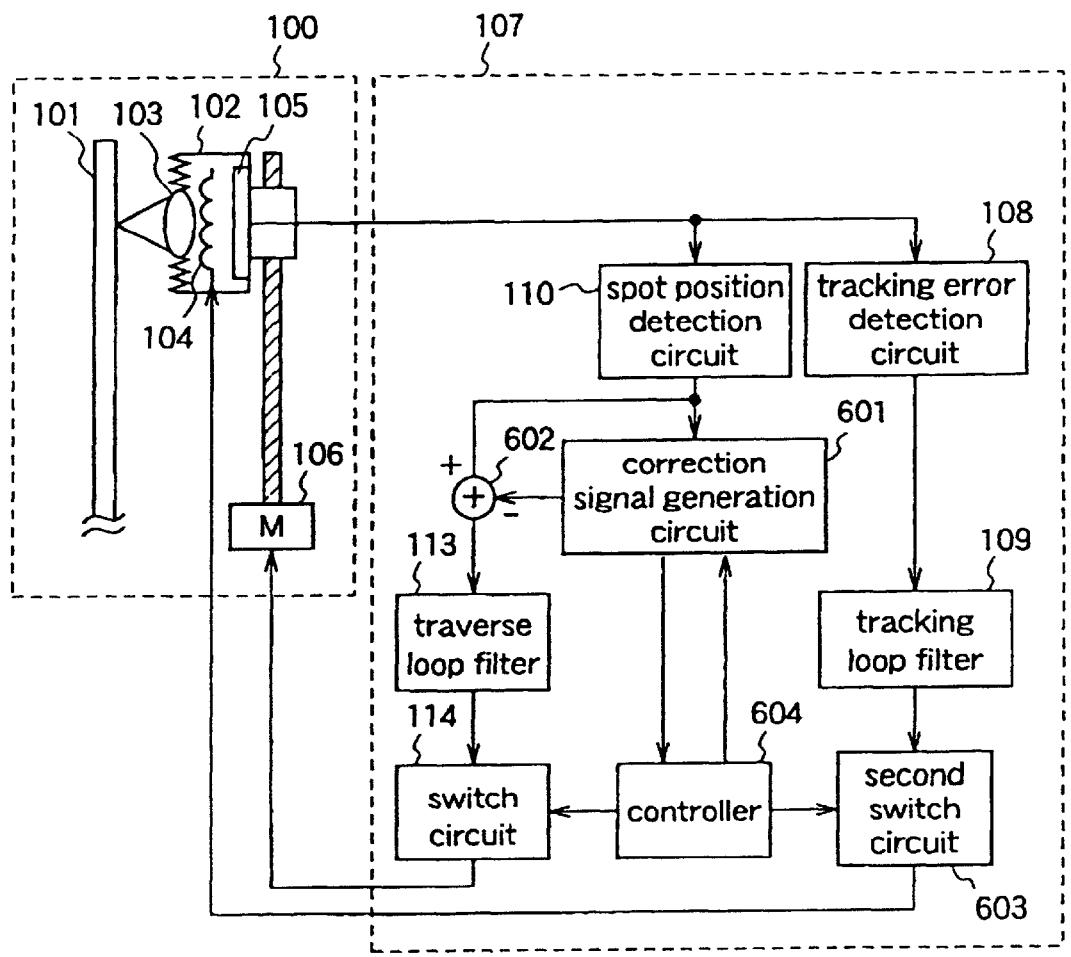
FIG. 7 is a block diagram illustrating an optical disc apparatus according to a third embodiment of the present invention.
Figure 8:
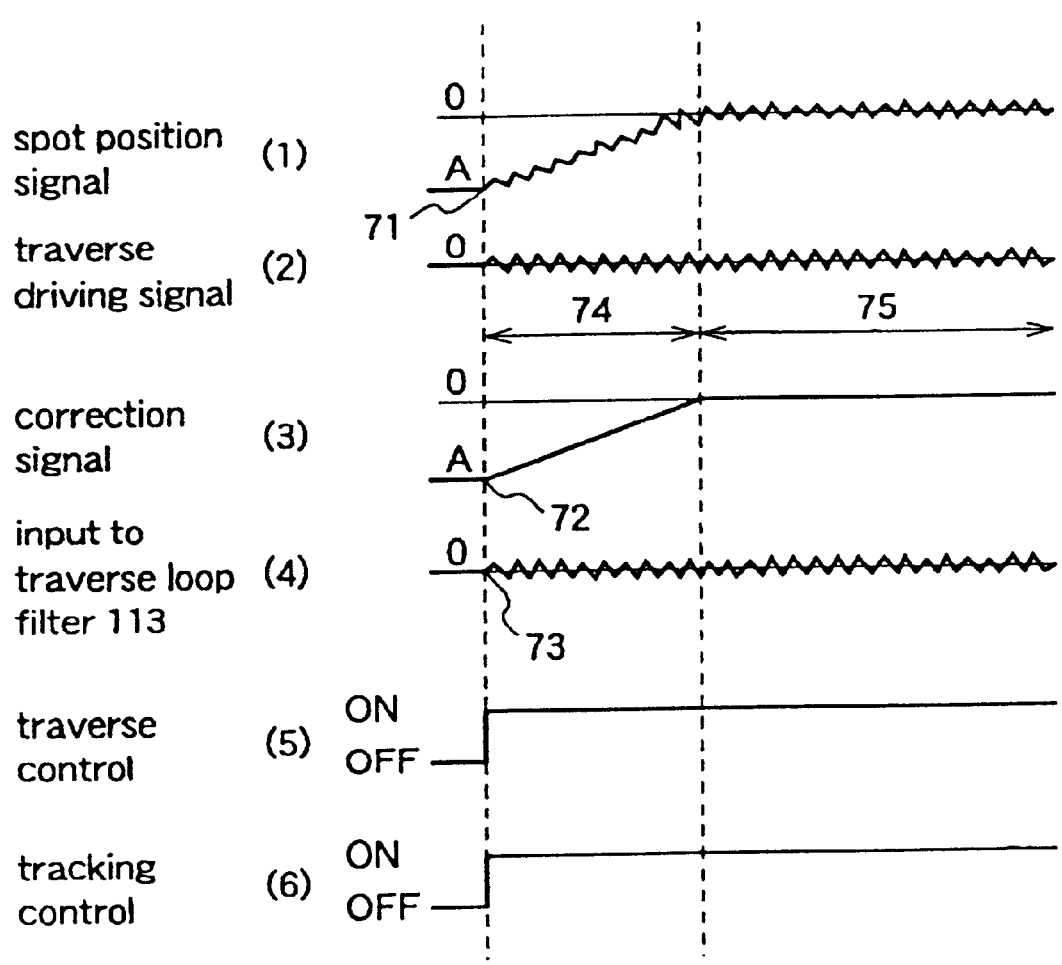
FIG. 8 is a waveform chart showing operations according to the third embodiment.
Figure 9:
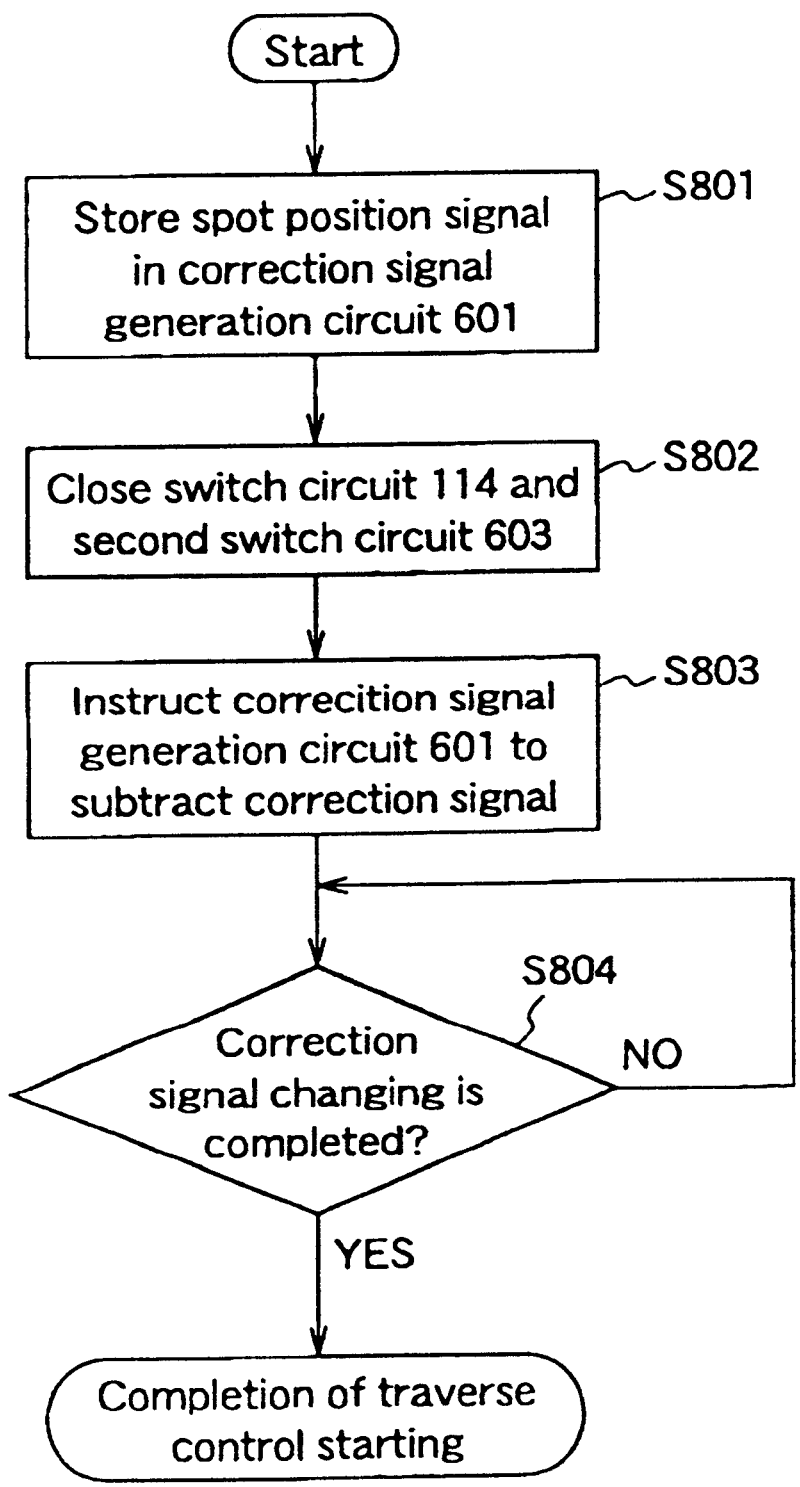
FIG. 9 is a flowchart showing processings by a controller 604 in the third embodiment.
Figure 10:
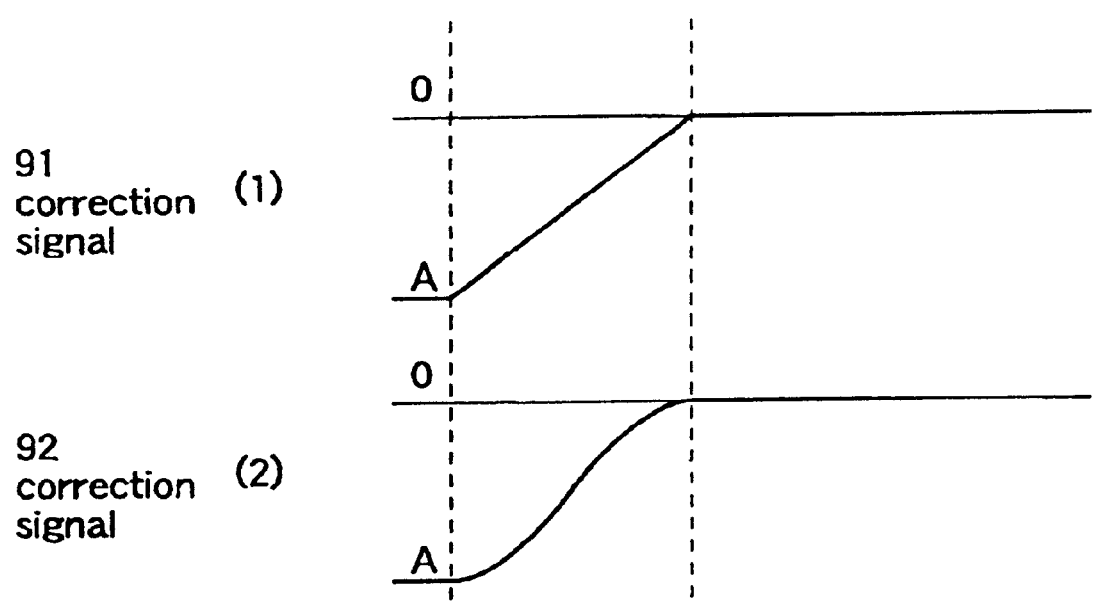
FIG. 10 is a chart showing waveforms of a correction signal in the third embodiment.

FIG. 7 is a block diagram illustrating an optical disc apparatus according to the third embodiment. FIG. 8 is a waveform chart showing operations according to the third embodiment. FIG. 9 is a flowchart showing processings by a controller 604. FIG. 10 is a diagram showing waveforms of correction signals in the third embodiment.

In FIG. 7, numerals 100–114 denote elements of the same reference numerals as those shown in FIG. 1. Numeral 601 denotes a correction signal generation circuit as correction signal generation means, for generating a correction signal for correcting a spot position signal. Numeral 602 denotes a subtracter as subtracting means for subtracting the correction signal from the spot position signal (hereinafter referred to as "before-correction spot position signal)" output from the spot position detection circuit 110. The spot position signal input to the traverse loop filter 113 after being corrected by using the correction signal is hereinafter referred to as "after-correction spot position signal". Numeral 603 denotes a second switch circuit for switching on/off the supply of the signal to the tracking actuator 104, in accordance with an instruction of a controller 604 which is described later. Numeral 604 denotes a controller for controlling the switch circuit 114, the second switch circuit 603, and the correction signal generation circuit 601. This controller 604 constitutes second control means together with the switch circuit 114. The second control means subjects the output of the subtracter 602 to the processing by the traverse loop filter 113, and outputs the output to the traverse motor 106 as the second moving means, via the switch circuit 114.

Next, a description is given of an operation of the so constructed optical disc apparatus according to the third embodiment.

When the objective lens 103 experiences gravity in a radial direction of the optical disc 101, the objective lens 103 is displaced due to the self-weight. The spot position signal has an offset of a predetermined value A (A≠0), as shown by numeral 71 in FIG. 8. The controller 604 controls the correction signal generation circuit 601 to store the value of the spot position signal at that time in prior to the execution of the traverse control and output the value as the correction signal (see 72 in FIG. 8 and step S801 in FIG. 9). The subtracter 602subtracts the correction signal from a before-correction spot position signal output by the spot position detection circuit 110. Accordingly, an after-correction spot position signal output from the subtracter 602 has a value of approximately "0" (see 73 in FIG. 8). Then, the controller 604 closes the second switch circuit 603 thereby supplying the output of the tracking loop filter 109 to the tracking actuator 104, controls the light spot to follow the track on the optical disc 101, further closes the switch circuit 114 thereby supplying the output of the traverse loop filter 113 to the traverse motor 106, and thereby moves the optical head 102 so as to locate the light spot in the vicinity of the center of the optical head 102 (step S802 in FIG. 9). At this time, since the after-correction spot position signal input to the traverse loop filter 113 is approximately "0", the output from the traverse loop filter 113 is also approximately "0". Therefore, the traverse motor 106 scarcely operates.

Then, the controller 604 instructs the correction signal generation circuit 601 to gradually increase the correction signal up to near "0" (step S803 in FIG. 9), and waits for the completion of the correction signal changing by the correction signal generation circuit 601 (step S804 in FIG. 9). When the correction signal is changed, a difference is generated between the before-correction spot position signal and the correction signal. Since the traverse loop filter 113 and the traverse motor 106 operate so as to make this difference, i.e., the after-correction spot position signal "0", the before-correction spot position signal is changed so as to have almost the same waveform as that of the correction signal (see 74 in FIG. 8). When the correction signal which is to be output has "0" value, the correction signal generation circuit 601 keeps the correction signal in "0" (see 75 in FIG. 8), and notifies to the controller 604 of the completion of the correction signal changing. When the controller 604 receives the notification of the completion of the correction signal changing, it completes the starting of the traverse control.

The spot position signal can be changed by the correction signal linearly with a predetermined time constant (see 91 in FIG. 10) or sinusoidally (see 92 in FIG. 10). However, the latter is more desirable because the spot position control can be followed more smoothly in that case. Further, it is desirable that the changing speed of the correction signal is lower than the control band of the traverse control. Accordingly, the traverse control can follow the change in the spot position signal with stability.

As described above, the apparatus according to the third embodiment stores the spot position signal at the starting of the traverse control, subtracts the stored signal as a correction signal from the spot position signal, and supplies the obtained difference to the traverse loop filter 113. Therefore, the input to the traverse loop filter 113 can be always kept in a small value, whereby the unstableness in the traverse control due to the large initial error signal can be avoided.

In this third embodiment, the correction signal is subtracted using the subtracter 602. However, any unit, such as a unit for holding a correction signal after performing the inversion and using the adder to subtract the correction signal from the before-correction spot position signal, can be utilized as long as it can substantially subtract the correction signal from the before-correction spot position signal.

Embodiment 4.

Figure 12:
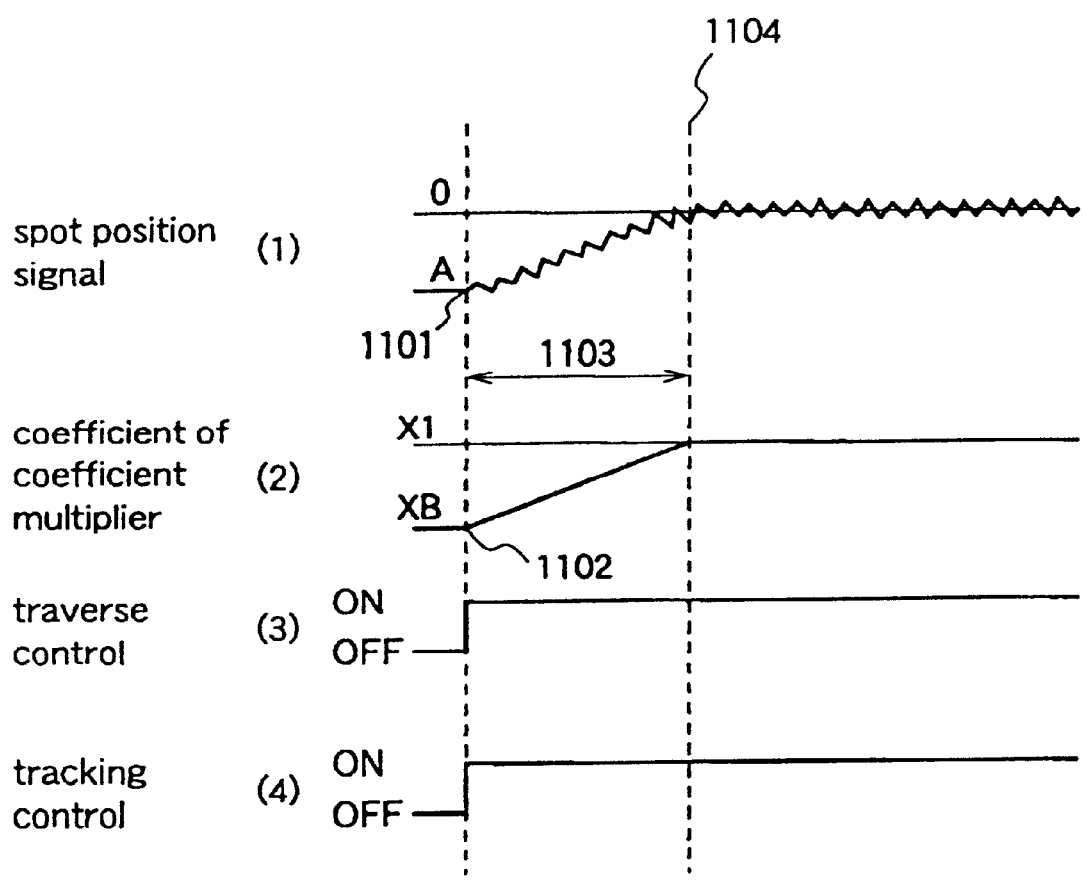
FIG. 12 is a waveform chart showing operations according to the fourth embodiment.
Figure 13:
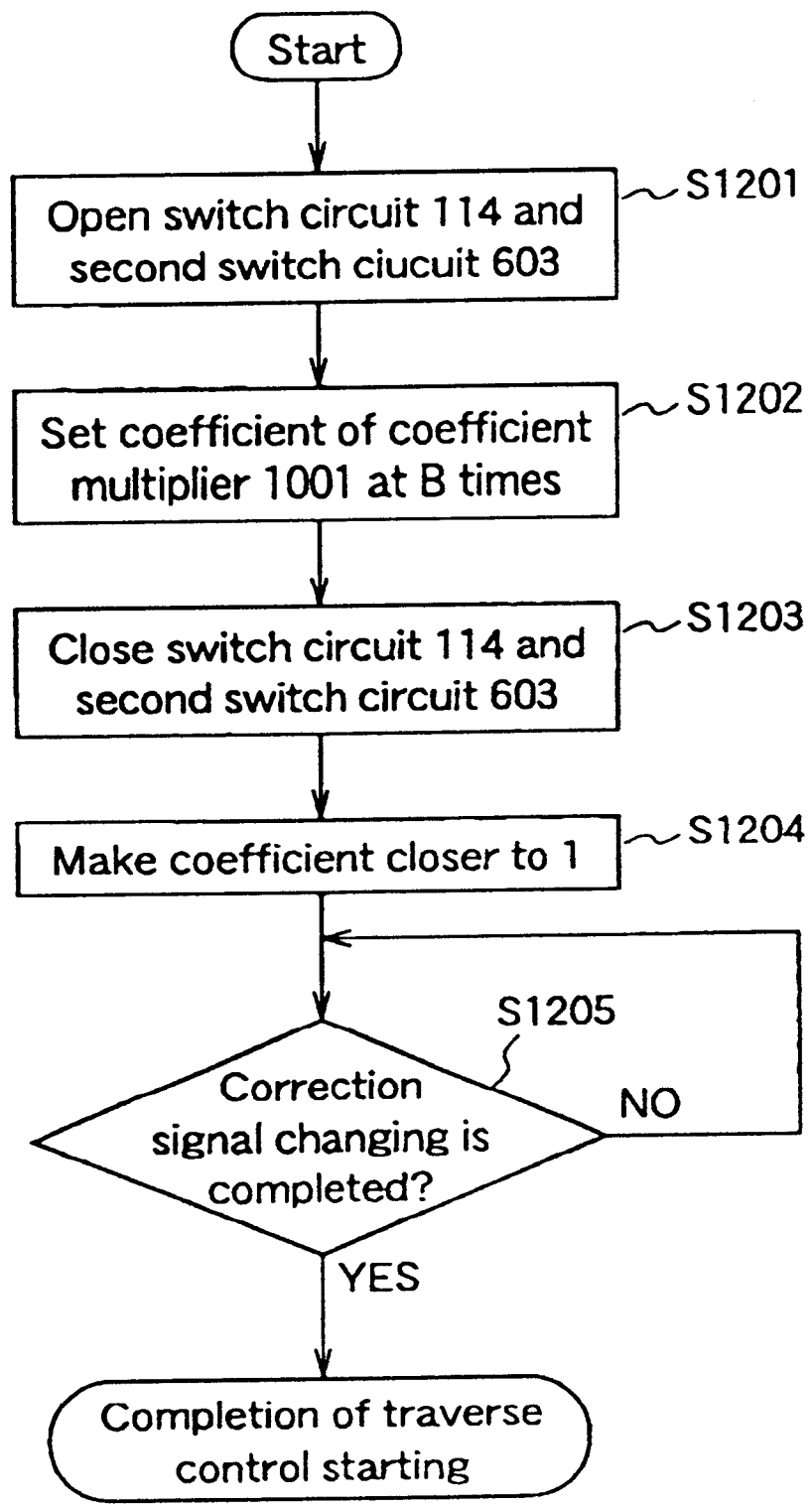
FIG. 13 is a flowchart showing processings by a controller 1002 in the fourth embodiment.
Figure 14:
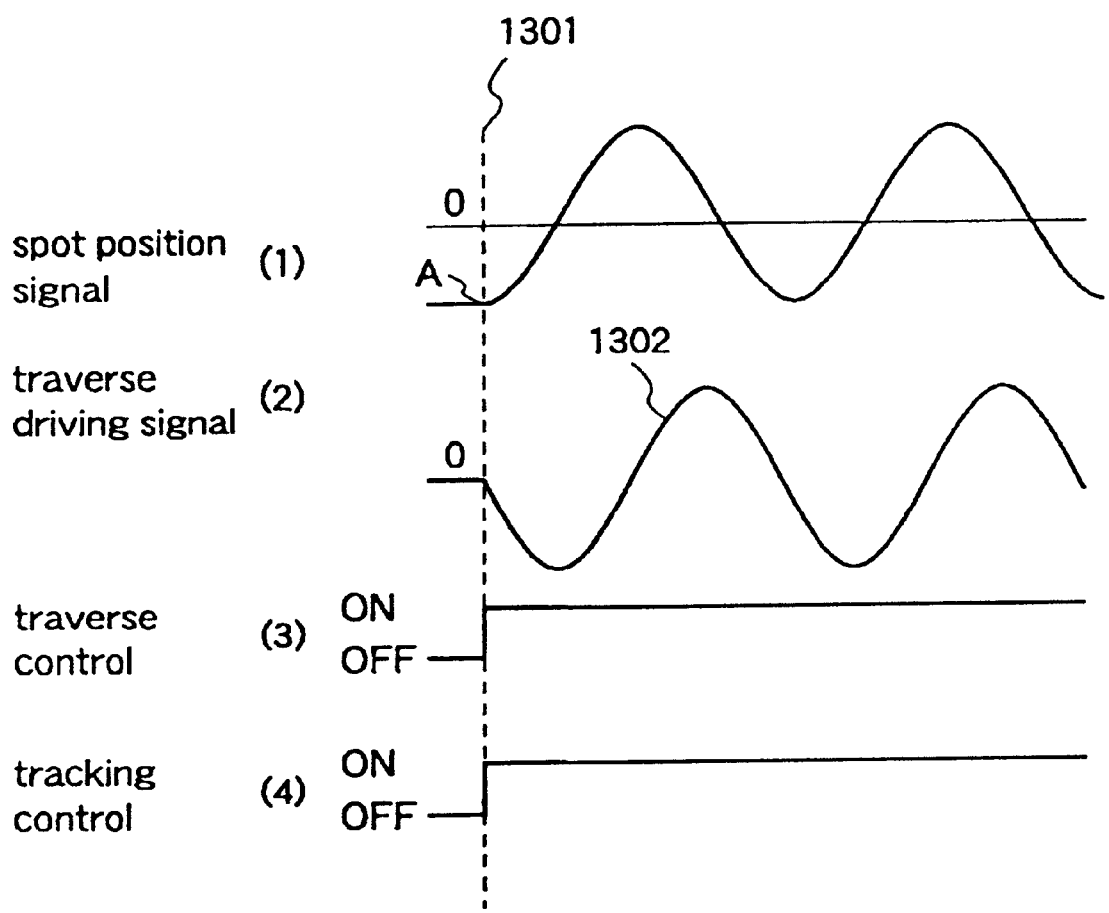
FIG. 14 is a waveform chart showing operations according to a conventional optical disc apparatus.
Figure 15:
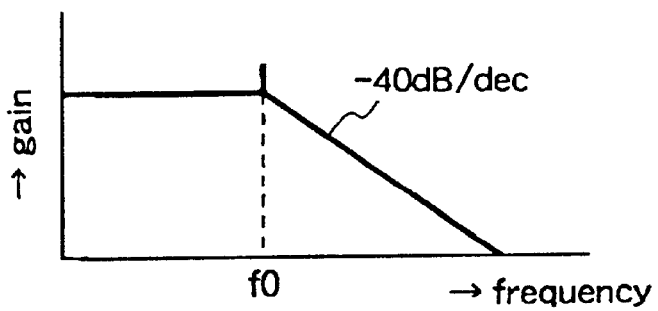
FIGS. 15 are diagrams showing loop characteristics of spot position control, FIG. 15($a$) being a diagram showing open-loop gain characteristics without a spot position loop filter, FIG. 15($b$) being a diagram showing gain characteristics of the spot position loop filter, and FIG. 15($c$) being a diagram showing open-loop characteristics of the whole spot position control.
Figure 15:
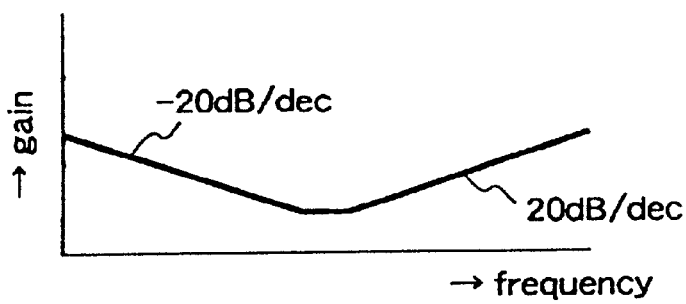
Figure 15:
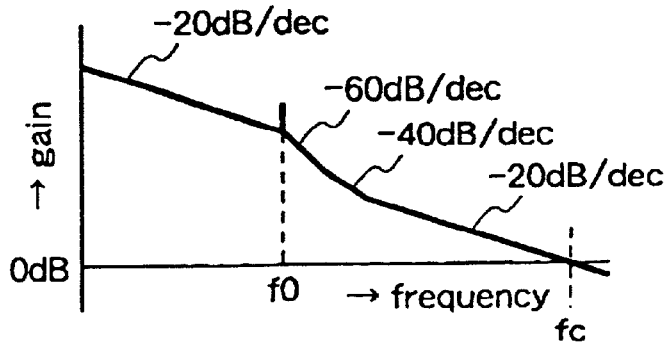

A fourth embodiment of the present invention will be described with reference to FIGS. 11, 12, and 13.

The fourth embodiment corresponds to claim 4. In this embodiment, a loop gain of the traverse control is set to have a small value at the starting of the traverse control, and thereafter the gain is changed to have a desired value, thereby stabilizing the operation at the starting of the traverse control.

Figure 11:
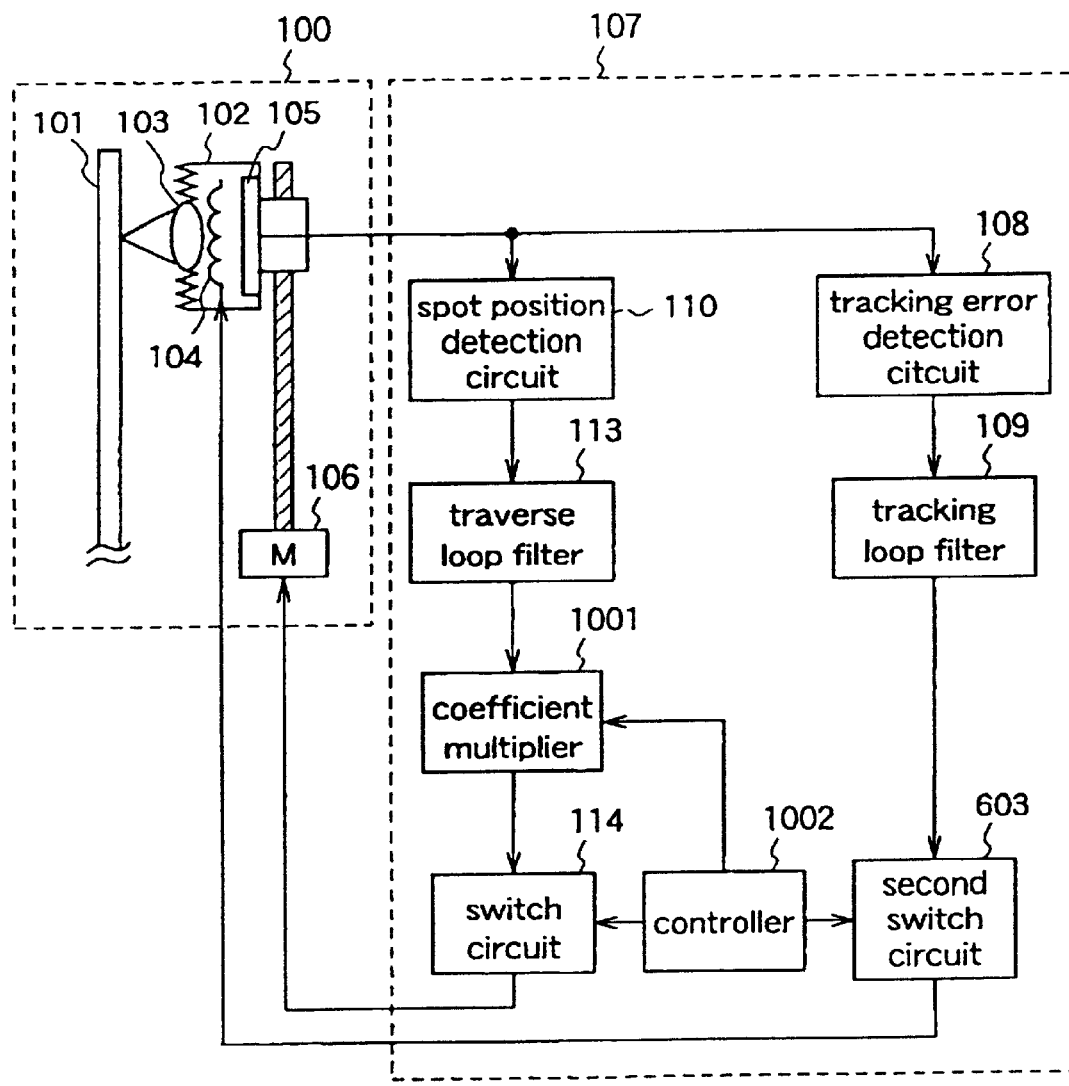
FIG. 11 is a block diagram illustrating an optical disc apparatus according to a fourth embodiment of the present invention.

FIG. 11 is a block diagram illustrating an optical disc apparatus according to the fourth embodiment. FIG. 12 is a waveform chart showing operations according to the fourth embodiment. FIG. 13 is a flowchart showing processings by a controller 1002.

In FIG. 11, numerals 100–114 denote the elements of the same reference numerals as those shown in FIG. 1. In addition, numeral 603 denotes the element of the same reference numeral as that shown in FIG. 7. Numeral 1001 denotes a coefficient multiplier for coefficient multiplying an output from the traverse loop filter 113, and outputting the same. Numeral 1002 denotes a controller for controlling the switch circuit 114, the coefficient multiplier 1001, and the second switch circuit 603. This controller 1002 constitutes second control means together with the coefficient multiplier 1001 and the switch circuit 114. The second control means subjects the spot position signal to the processing by the traverse loop filter 113 and outputs the processed signal to the traverse motor 106 as the second moving means, as well as controls a coefficient of the coefficient multiplier 1001 at the starting of the operation to have a value smaller than that at the normal operation.

Hereinafter, an operation of the optical disc apparatus according to the fourth embodiment will be described.

When gravity is applied to the objective lens 103 in a radial direction of the optical disc 101, the objective lens 103 is displaced from the center of the optical head 102 due to the self-weight. Accordingly, the spot position signal has an offset of a value A (see 1101 in FIG. 12). The controller 1002 opens the switch circuit 114 and the second switch circuit 603, and stops the driving of the tracking actuator 104 and the traverse motor 106 (step S1201 in FIG. 13). Next, the controller 1002 sets a coefficient of the coefficient multiplier 1001 at B times (0<B<1), for example, 0.1 times (see 1102 in FIG. 12 and step S1202 in FIG. 13). Then, the controller closes the switch circuit 114 and the second switch circuit 603, supplies the output of the tracking loop filter 109 to the tracking actuator 104, and supplies the output of the traverse loop filter 113, which is coefficient multiplied by the coefficient multiplier 1001, to the traverse motor 106, thereby executing the tracking control and the traverse control (step S1203 in FIG. 13). In this case, the spot position signal input to the traverse loop filter 113 remains having the value A. However, since the value B is set in the coefficient multiplier 1001, the voltage supplied to the traverse motor 106 is reduced with relative to a case without the coefficient multiplier 1001. Therefore, the operation of the optical head 102 by the traverse motor 106 is slowed. The controller 1002 makes the coefficient of the coefficient multiplier 1001 closer to "1" with the lapse of time (see 1103 in FIG. 12 and step S1204 in FIG. 13). In this way, the coefficient of the coefficient multiplier 1001 is initially set to have a smaller value in the state where the spot position signal is large and the coefficient is increased with the lapse of time, whereby the optical head 102 can be moved smoothly. The controller 1002 judges that the coefficient has a value of "1", and completes rising processing of the traverse control in the state of the coefficient of "1" (step S1205 in FIG. 13).

As described above, the apparatus according to the fourth embodiment includes the coefficient multiplier 1001, sets the coefficient of the coefficient multiplier to have a smaller value at the starting of the traverse control to decrease the loop gain of the traverse control, and gradually increases the coefficient, thereby obtaining the desired gain. Therefore, the operation at the starting of the traverse control can be stabilized with a simple structure using the coefficient multiplier, without providing the new control system which performs the tracking control by the spot position signal as described in the first and second embodiments.

In this fourth embodiment, the coefficient multiplier 1001 is provided in a next stage of the traverse loop filter 113. However, this can be provided between the spot position detection circuit 110 and the traverse loop filter 113, or between the switch circuit 114 and the traverse motor 106. Or, any unit including a unit for changing the gain of the traverse loop filter 113 can be used as long as it changes the loop gain of the servo loop constituting the traverse control.

Further, in the fourth embodiment, the example where the coefficient of the coefficient multiplier 1001 is changed linearly is described. However, as similar to the correction signal in the third embodiment, the coefficient can be changed in any manner including a manner of changing the coefficient sinusoidally, as long as the coefficient is set to have a small value at first and finally have the desired gain for the traverse control loop.

In the foregoing description, the spot position signal is generated from the output of the light receiving element 105 in the optical head 102. However, a lens position sensor for detecting a position of the lens can be provided separately from the light receiving element. In such a structure, the lens position can be used as a spot position.

What is claimed is:

1. An optical disc apparatus for applying a light spot to a surface of an optical disc, to record or reproduce information on or from an optical disc, comprising:

first moving means for moving the light spot radially across the surface of an optical disc;

an optical head comprising converging means for converging the light spot on the surface of an optical disc;

spot position detection means for generating a spot position signal which indicates a positional difference in a radial direction of an optical disc, between a center of the optical head and the light spot on a receiving element on the optical head;

first control means for causing a spot position loop filter to filter the spot position signal to generate a first processed signal and outputting the first processed signal to the first moving means;

second moving means for moving the optical head radially across the surface of an optical disc;

second control means for causing a traverse loop filter to filter the spot position signal to generate a second processed signal and outputting the second processed signal to the second moving means; and system operation control means for sequentially operating the first control means and the second control means.

2. The optical disc apparatus of claim 1, wherein the first control means for generating a first processed signal comprises a phase-lag compensation.

3. The optical disc apparatus of claim 2, wherein the first control means for generating a first processed signal further comprises, compensation for reducing an open-loop gain at a primary resonance frequency of the first moving means.

4. The optical disc apparatus of claim 1, wherein the first control means comprises a phase-lead compensation and a phase-lag compensation, and the phase-lead compensation begins at a frequency lower than a primary resonance frequency of the first moving means.

5. An optical disc apparatus for applying a light spot to a surface of an optical disc, to record or reproduce information on or from an optical disc, comprising:

first moving means for moving the light spot radially across the recording surface of an optical disc;

an optical head comprising converging means for converging the light spot on the surface of an optical disc;

spot position detection means for generating a spot position signal which indicates a positional difference in a radial direction of an optical disc, between a center of the optical head and the light spot on a receiving element on the optical head;

first control means for causing a spot position loop filter to filter the spot position signal to generate a first processed signal and outputting the first processed signal to the first moving means;

second moving means for moving the optical head radially across the surface of an optical disc;

second control means for causing a traverse loop filter to filter the spot position signal to generate a second processed signal and outputting the second processed signal to the second moving means;

spot position signal monitoring means for receiving the spot position signal as an input, and outputting a first signal indicating that the spot position signal has a value smaller than a prescribed value; and system operation control means for operating the first control means when the first signal is input, and operating the second control means after or simultaneously with the operation of the first control means.

6. An optical disc apparatus for applying a light spot to a surface of an optical disc, to record or reproduce information on or from an optical disc, comprising:

first moving means for moving the light spot radially across the recording surface of an optical disc;

an optical head comprising converging means for converging the light spot on the surface of the optical disc;

spot position detection means for generating a spot position signal which indicates a positional difference in a radial direction of an optical disc, between a center of the optical head and the light spot on a receiving element on the optical head;

correction signal generation means for receiving the spot position signal as an input, and generating a correction signal for correcting the spot position signal;

subtracting means for subtracting the correction signal from the spot position signal;

second moving means for moving the optical head radially across the surface of an optical disc; and control means for causing a traverse loop filter to filter the spot position signal to generate a second processed signal and outputting the second processed signal to the second moving means.

7. An optical disc apparatus for applying a light spot to a surface of an optical disc, to record and reproduce information on or from an optical disc, comprising:

first moving means for moving the light spot radially across the recording surface of an optical disc;

an optical head comprising converging means for converging the light spot on the surface of an optical disc;

spot position detection means for generating a spot position signal which indicates a positional difference in a radial direction of the optical disc, between a center of the optical head and the light spot on a receiving element on the optical head;

second moving means for moving the optical head radially across the surface of an optical disc;

control means for causing a traverse loop filter to filter the spot position signal to generate a second processed signal and outputting the second processed signal to the second moving means; and a coefficient multiplier for reducing a control means control coefficient to a value smaller than a normal operation value, at startup of the control means.

8. An optical disc apparatus for applying a light spot to a surface of an optical disc, to record or reproduce information on or from an optical disc, comprising:

first moving means for moving the light spot radially across the surface of an optical disc;

an optical head comprising converging means for converging the light spot on the surface of an optical disc;

spot position detection means for generating a spot position signal which indicates a positional difference in a radial direction of an optical disc, between a center of the optical head and the light spot on a receiving element on the optical head;

tracking error detection means for generating a tracking error signal which indicates a positional dislocation between the light spot and a track on an optical disc;

first control means for causing a spot position loop filter to filter the spot position signal or the tracking error signal to generate a first processed signal and outputting the first processed signal to the first moving means;

second moving means for moving the optical head radially across the surface of an optical disc;

control means for causing a traverse loop filter to filter the spot position signal to generate a second processed signal and outputting the second processed signal to the second moving means; and system operation control means for operating the first control means to cause the phase compensation loop filter to filter the spot position signal, said filtering being a phase-lag compensation and a phase-lead compensation filtering, said system operation control means for switching from the spot position signal to the tracking error signal to cause the phase compensation loop filter to filter the tracking error signal, said filtering being a phase-lag compensation and a phase-lead compensation filtering, and operating the second control means after operating the first control means.

* * * * *